(12) United States Patent
Elprin et al.

(10) Patent No.: US 12,147,877 B2
(45) Date of Patent: Nov. 19, 2024

(54) SYSTEMS AND METHODS FOR MODEL MONITORING

(71) Applicant: Domino Data Lab, Inc., San Francisco, CA (US)

(72) Inventors: Nicholas Elprin, San Francisco, CA (US); Christopher Yang, Cupertino, CA (US); Madhavan Thirumalai, San Francisco, CA (US)

(73) Assignee: Domino Data Lab, Inc., San Francisco, CA (US)

( * ) Notice: Subject to any disclaimer, the term of this patent is extended or adjusted under 35 U.S.C. 154(b) by 923 days.

(21) Appl. No.: 17/088,184

(22) Filed: Nov. 3, 2020

(65) Prior Publication Data
US 2021/0133632 A1    May 6, 2021

Related U.S. Application Data

(60) Provisional application No. 62/930,490, filed on Nov. 4, 2019.

(51) Int. Cl.
*G06N 5/04* (2023.01)
*G06F 11/30* (2006.01)
(Continued)

(52) U.S. Cl.
CPC ........... *G06N 20/00* (2019.01); *G06F 11/302* (2013.01); *G06F 16/901* (2019.01)

(58) Field of Classification Search
CPC .......... G06N 20/00; G06N 5/01; G06N 20/10; G06F 11/302; G06F 16/901; G06F 11/3058; G06F 11/3409
See application file for complete search history.

(56) References Cited

U.S. PATENT DOCUMENTS

10,599,957 B2    3/2020    Walters et al.
11,315,039 B1    4/2022    Elprin et al.
(Continued)

FOREIGN PATENT DOCUMENTS

CN    1787392 A    *    6/2006    ............. G06N 20/00
CN    110717543 A    *    1/2020    ............. G06N 20/00
(Continued)

OTHER PUBLICATIONS

Co-pending U.S. Appl. No. 17/702,185, inventors Elprin; Nicholas et al., filed Mar. 23, 2022.
(Continued)

*Primary Examiner* — Hassan Mrabi
(74) *Attorney, Agent, or Firm* — Wilson Sonsini Goodrich & Rosati

(57) ABSTRACT

Improved systems and methods for improved management of models for data science can facilitate seamless collaboration of data science teams and integration of data science workflows. Systems and methods provided herein can provide an open, unified platform to build, validate, deliver, and monitor models at scale. Systems and methods of the present disclosure may accelerate research, spark collaboration, increase iteration speed, and remove deployment friction to deliver impactful models. In particular, users may be allowed to visualize statistics about models and monitor models in real-time via a graphical user interface provided by the systems.

18 Claims, 16 Drawing Sheets

(51) Int. Cl.
*G06F 16/901* (2019.01)
*G06N 20/00* (2019.01)

(56) References Cited

U.S. PATENT DOCUMENTS

| | | |
|---|---|---|
| 11,763,201 B1 | 9/2023 | Elprin et al. |
| 2010/0153316 A1 | 6/2010 | Duffield et al. |
| 2013/0232123 A1 | 9/2013 | Ahmed et al. |
| 2013/0268913 A1 | 10/2013 | Anderson et al. |
| 2015/0379429 A1 | 12/2015 | Lee et al. |
| 2016/0048408 A1 | 2/2016 | Madhu et al. |
| 2016/0300156 A1 | 10/2016 | Bowers et al. |
| 2017/0091868 A1* | 3/2017 | Trainor ............... G06N 5/04 |
| 2017/0091869 A1* | 3/2017 | Trainor ............... G06N 20/20 |
| 2017/0124486 A1 | 5/2017 | Chan et al. |
| 2017/0206469 A1* | 7/2017 | Das ............... G05B 13/048 |
| 2017/0286502 A1* | 10/2017 | Bar-Or ............... G06F 8/34 |
| 2017/0286526 A1* | 10/2017 | Bar-Or ............... G06F 8/34 |
| 2017/0330109 A1 | 11/2017 | Maughan et al. |
| 2017/0351511 A1* | 12/2017 | Bar-Or ............... G06F 8/34 |
| 2020/0151619 A1* | 5/2020 | Mopur ............... H04L 67/12 |
| 2020/0387797 A1* | 12/2020 | Ryan ............... G06N 3/084 |

FOREIGN PATENT DOCUMENTS

| | | | | |
|---|---|---|---|---|
| GB | 2557253 A | * | 6/2018 | ............ G06F 21/56 |
| WO | WO-2016165923 A1 | * | 10/2016 | ....... G05B 19/41865 |
| WO | WO-2021079444 A1 | * | 4/2021 | ............ G06N 20/00 |
| WO | WO-2021079445 A1 | * | 4/2021 | ............ G06N 20/00 |
| WO | WO-2021079447 A1 | * | 4/2021 | ............ G06N 20/00 |
| WO | WO-2021091918 A1 | | 5/2021 | |

OTHER PUBLICATIONS

U.S. Appl. No. 16/529,518 Notice of Allowance dated Mar. 10, 2022.
PCT/US20/58744 International Search Report and Written Opinion dated Feb. 3, 2021.
U.S. Appl. No. 16/529,518 Office Action dated Oct. 15, 2021.
Co-pending U.S. Appl. No. 16/529,518, inventors Elprin; Nicholas et al., filed Aug. 1, 2019.
Co-pending U.S. Appl. No. 18/449,369, inventors Elprin; Nicholas et al., filed Aug. 14, 2023.
U.S. Appl. No. 17/702,185 Notice of Allowance dated Aug. 9, 2023.
U.S. Appl. No. 17/702,185 Office Action dated Mar. 3, 2023.

* cited by examiner

FIG. 6A

| Status | Feature | Training Data | Prediction Data | Test Type | Test Condition | Threshold | Calculated Drift | Drift Trends |
|---|---|---|---|---|---|---|---|---|
| ● | age | | | Kulback-Leibler Divergence | Less than | 0.3 | 0.0820 | |
| ● | job | | | Kulback-Leibler Divergence | Less than | 0.3 | 0.2465 | |
| ● | education | | | Kulback-Leibler Divergence | Less than | 0.3 | 0.4268 | |
| ● | housing | | | Kulback-Leibler Divergence | Less than | 0.3 | 0.0047 | |
| ● | loan | | | Kulback-Leibler Divergence | Less than | 0.3 | 0.0544 | |
| ● | poutcome | | | Kulback-Leibler Divergence | Less than | 0.3 | 0.4423 | |

FIG. 6B

Runs

| NAME | CATEGORY | MCC | AUC | PRECISION | RECALL | F1 | ACCURACY | RULES |
|---|---|---|---|---|---|---|---|---|
| PL w SM Meta | Logistic Regression | 0.938 | 0.999 | 0.914 | 0.913 | 0.914 | 91% | Data Drift Rule / Model Perf. Rule |
| PL w SM 2017 | Logistic Regression | 0.919 | 0.988 | 0.960 | 0.917 | 0.944 | 94% | |
| AL w SM 2017 | Logistic Regression | 0.990 | 0.937 | 0.970 | 0.915 | 0.960 | 96% | |
| AL w SM 2016 | Logistic Regression | 0.980 | 0.934 | 0.935 | 0.956 | 0.923 | 92% | 3 rules applied |

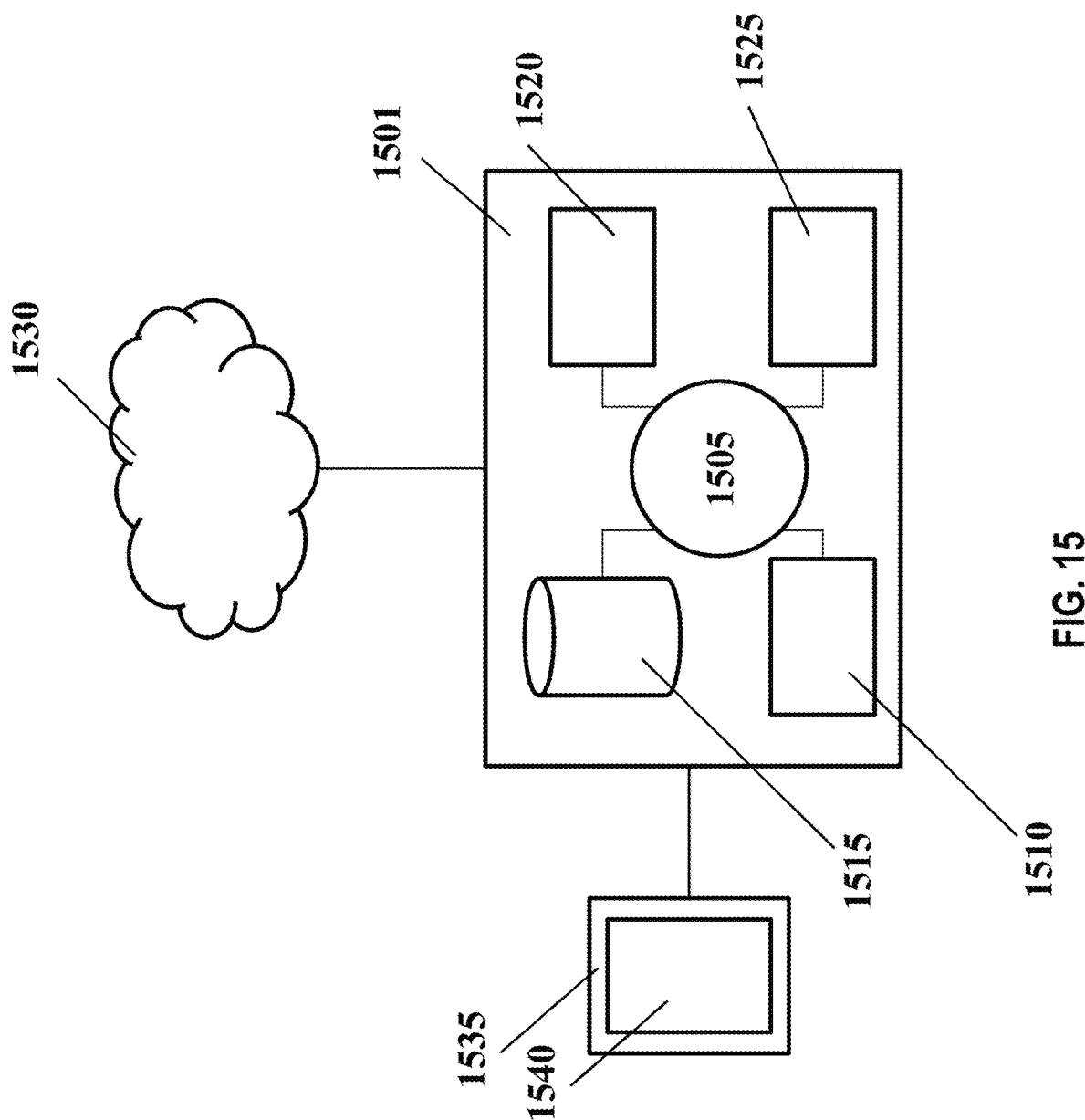

SYSTEMS AND METHODS FOR MODEL MONITORING

CROSS-REFERENCE

This application claims the benefit of U.S. Provisional Application No. 62/930,490, filed Nov. 4, 2019, which application is incorporated herein by reference in its entirety.

BACKGROUND

Models are the central output of data science, and they have tremendous power to transform companies, industries and society. Models are algorithms whose instructions are induced from a set of data and are then used to make predictions, recommendations, or prescribe an action based on a probabilistic assessment.

Companies use models to create new products and drive ongoing operational improvement. Companies may need to develop organizational capability to manage models to enable the companies to reliably and securely develop, validate, deliver and monitor models. In reality, data is constantly evolving which has important consequences for models that have been deployed into production systems. As data evolves over time (e.g., data drift), predictions from these models may become less accurate. Such data drift may require models to be retrained and re-scored.

SUMMARY

Models can degrade for a variety of reasons. For example, changes to products or policies may affect how may customers behave; adversarial actors may adapt their behavior; data pipelines may break; and sometimes the world simply evolves. In some cases, model degradation may be due to data drift and/or concept drift.

Data drift may occur when production data diverges from the model's original training data. Data drift can happen for a variety of reasons, including a changing business environment, evolving user behavior and interest, modifications to data from third-party sources, data quality issues, and even issues in upstream data processing pipelines. For example, if readings from an industrial sensor started changing over time due to mechanical wear and tear, that would lead to data drift.

Concept drift may occur when the expectations of what constitutes a correct prediction change over time even though the distribution of the input data has not changed. For example, loan applicants who were considered as attractive prospects last year (when the training dataset was created) may no longer be considered attractive because of changes in a bank's strategy or outlook on future macroeconomic conditions.

Model monitoring can be tedious, inefficient and costly. Current approaches to model monitoring vary widely across companies even within a single company's data science department. For example, a single data scientist or machine learning engineer on the team is given responsibility for monitoring a model. Some companies require a monitoring plan to be in place before an advanced analytics project is considered completed. Setting up the proper monitoring can add weeks to a project's lifecycle.

Recognized herein is a need for automated and universal systems and methods for detecting model drift at large scale. Systems and methods provided herein can efficiently monitor models at scale. In particular, systems and methods provide a visual tool for monitoring models with improved accuracy. Various aspects of models are monitored by the provided model monitor systems and methods. Systems and methods of the present disclosure may be capable of detecting data drift and/or performance drift (e.g., changes in data and model performance), performing integrity checks, notifying users/applications of a change or detected events, and/or automatically retraining models and re-scoring models. In some cases, the provided systems and methods may also be capable of monitoring traffic and a portfolio of models over time. In some cases, the provided systems and methods may monitor data drift or performance of a model in different phases (e.g., development, deployment, prediction, validation, etc) or perform data integrity checks for models that have been deployed in a development, test, or production environment.

The model monitor system can be a standalone system or self-contained component that can be independently operated and worked, and may be in communication with other systems or entities (e.g., a model development and management platform). For example, the model drift detection system can be an integrated component of a model management system for data science to facilitate seamless collaboration of data science teams and integration of data science workflows. Alternatively, the model monitor system may be a component or a subsystem of another system. In some cases, the model monitor system provided herein may be a platform as a service (PaaS) and/or software-as-a-service (SaaS) applications configured for providing a suite of pre-built, cross-industry applications, developed on its platform, that facilitate various entities monitor models. In some cases, the model monitor system may be an on-premise platform where the applications and/or software are hosted locally.

In an aspect, a system for monitoring machine learning models is provided. The system comprises: one or more computer processors that are programmed to provide an application comprising: (i) a first software module for detecting a drift for a plurality of machine learning models, wherein the first software module provides a first graphical user interface (GUI) for setting one or more rules for detecting the drift; and (ii) a second software module configured to display a result of the detection of the drift within a second GUI.

In some embodiments, the drift of the plurality of machine learning models comprises a drift in a dataset or a drift in model performance. In some embodiments, the first GUI is configured to receive a user input indicative of test method for an input feature, a threshold for triggering a detection event, or a combination of multiple metrics for multiple input features for a machine learning model selected from the plurality of machine learning models. In some cases, the first GUI is configured to further display the threshold over a diagram of the drift.

In some embodiments, the first GUI is configured to display multiple options for delivering a notification upon a detected drift event. In some embodiments, the second GUI is configured to display a drift trend, a calculated drift, a distribution of the training data and live data, or a test type, for at least one of the plurality of machine learning models. In some embodiments, the system further comprises a rule engine configured to automatically retrieve a rule associated with a machine learning model upon a new prediction is registered. IN SOME CASES, the system further comprises a process engine configured to execute the rule retrieved by the rule engine for computing the drift. In some embodiments, the system further comprises a database for storing the one or more rules associated with a machine learning model. In some cases, the database further stores a computing environment and one or more training datasets associated with the machine learning model.

In another aspect, a method for monitoring machine learning models is provided. The method comprises: providing a first graphical user interface (GUI) for setting one or more rules for detecting a drift for a plurality of machine learning models; and providing a second GUI for displaying a result of the detection of the drift. In some embodiments, the drift of the plurality of machine learning models comprises a drift in a dataset or a drift in model performance.

In some embodiments, the method further comprises receiving, within the first GUI, a user input indicative of test method for an input feature, a threshold for triggering a detection event, or a combination of multiple metrics for multiple input features for a machine learning model selected from the plurality of machine learning models. In some cases, the method further comprises displaying the threshold over a diagram of the drift.

In some embodiments, the method further comprises displaying, within the first GUI, multiple options for delivering a notification upon a detected drift event. In some embodiments, the method further comprises, within the second GUI, displaying a drift trend, a calculated drift, a distribution of the training data and live data, or a test type, for at least one of the plurality of machine learning models. In some cases, the method further comprises automatically retrieving, by a rule engine, a rule associated with a machine learning model upon a new prediction is registered.

In some embodiments, the method further comprises storing the one or more rules associated with a machine learning model in a database. In some cases, the method further comprises storing a computing environment and one or more training datasets associated with the machine learning model in the database.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Figure" and "FIG." herein), of which:

FIG. 6A shows an example of various features monitored for a set of models.

FIG. 6B shows an example of a user interface for model monitoring.

FIG. 7 shows an example of user interface for monitoring model drift.

FIG. 8 shows an example user interface for displaying integrity check results.

FIGS. 9-12 show examples of user interfaces for rules set up.

FIG. 15 shows a computer system that is programmed or otherwise configured to implement a model monitor system.

DETAILED DESCRIPTION

Figure 1:
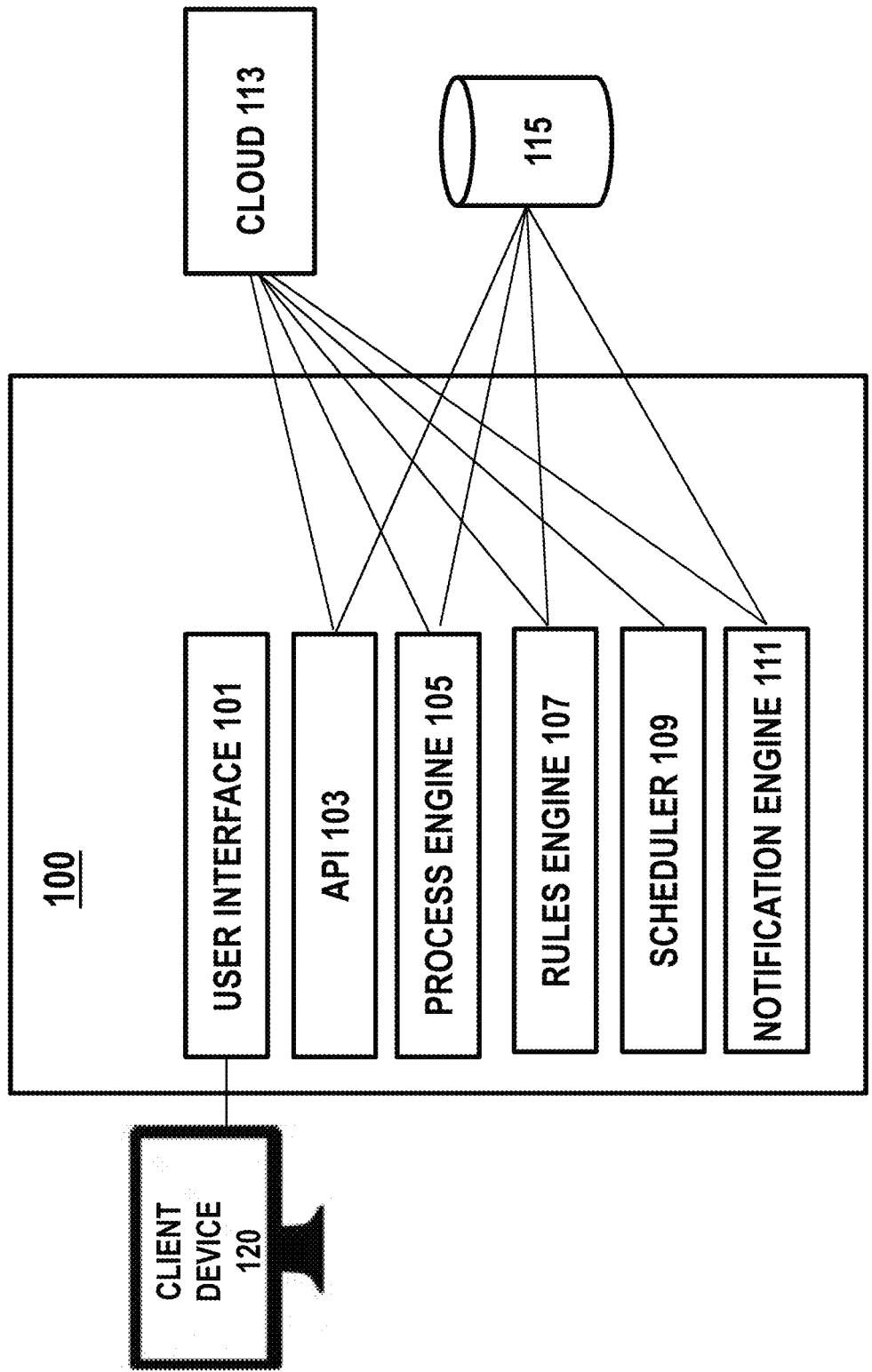
FIG. 1 schematically shows an exemplary system for monitoring models, in accordance with some embodiments of the invention.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

The present disclosure provides improved systems and methods for monitoring models. Model monitor systems and methods of the present disclosure may provide a visual platform to monitor models at scale. In particular, users may visualize statistics about models and monitor models in real-time via a graphical user interface provided by the systems. The provided model monitor systems may also allow users to customize rules for monitoring models. For instance, one or more metrics to be monitored, parameters for determining a drift, and/or rules for generating notification can be customized by users via the graphical user interface.

A model is a special type of algorithm. An algorithm is a hard-coded set of instructions to calculate a deterministic answer. Models are algorithms whose instructions are induced from a set of data and are then used to make predictions, to make recommendations, or to prescribe one or more actions based on a probabilistic assessment.

Models can be different from one another in various aspects such that an improved system or method for monitoring models at different scales taking into account the complexity is desired. Different models may use different techniques or tools, specialized hardware infrastructure (e.g., cloud computing, GPUs), or different development environments. Different models may be built differently. For example, the processes to develop models can be different. In some cases, different models may have different behaviors. Conventional model management may only track and monitor models running in production. The provided model monitor systems and methods are capable of enabling entities (e.g., companies, organizations, teams, individuals) to reliably and securely monitor models with improved accuracy and flexibility, thereby improving the development and operational efficiency of the entities.

A model can be an artifact created or trained by applying an algorithm to training data. The model may then be deployed to make predictions against real data. One or more models may be associated with an experiment. The one or more models may evolve over time as different data sets are provided to the algorithm or when parameters are adjusted.

The model monitor methods and systems may manage, track and monitor various aspects of data science lifecycles such as the technologies or processes for developing, validating, delivering models. For example, the entire system/platform and knowledge generated throughout the processes of model development and model production may be monitored by the model monitor system. Various aspects of models in different stages of the processes can be visualized via a graphical user interface.

The various aspects managed and monitored by the model monitor system may include, but are not limited to, model technologies (e.g., compute infrastructure, software tooling), model development (e.g., data, experiments, processes of building a model, model validation processes), model production (e.g., performance of model, model deployment, integration of model into downstream systems, impact of model products on business, model drifting), model governance (e.g., model dependency graph, model portfolio, status of model), and model context (e.g., artifacts generated during building models or using models).

In some cases, each of the models may be fully versioned, such that they can reflect changes across time. For example, a model may be specified by a model ID and a version number. A model can be retrieved by the unique model ID and version number. In some cases, every time a model is created or updated, a previous version of the model (if any) may be archived in a registry, and a more recent version of the model may be generated. The versioning may comprise assigning a new unique identifier to the updated model. In addition, the versioning may comprise saving the time point (e.g., date and time of the most recent update). The provided model monitor system may monitor different versions of models. The unique versioning allows for easy and efficient retrieving and managing various data associated with a model.

In an example, a model is uniquely specified by model_id (i.e., model ID) that is unique within the system. In another example, a given version of a model can be specified by model_id.version_number (i.e., model ID and version number). It should be noted that the abovementioned examples are for illustrative purpose only and other suitable formats or structures can be used to specify a model and a version of a model.

In some embodiments, a component of the model monitor system may be configured for generating the model IDs. For example, the component can be an ID generator that generates a unique or monotonically increasing model ID (e.g., model_id). The model ID may be unique within a system, a data store, an organization or across all the models developed or deployed by a model management platform. The ID generator may generate a model ID upon called by other components or systems. In some embodiments, the ID generator may also be configured to generate or manage version numbers. Alternatively, version numbers can be managed or generated by a separate component. The model ID and/or version number may be stored in a database. Details about the model database are described later herein.

The model monitor systems and methods include a visual tool for visualizing various aspects of models in a convenient and dynamic manner. A graphical user interface (GUI) can be provided on a display of an electronic device. In some situations, the GUI may have various graphical, textual, audio and/or video elements. A GUI is a type of interface that allows users to interact with electronic devices through graphical icons and visual indicators such as secondary notation, as opposed to text-based interfaces, typed command labels or text navigation. The actions in a GUI are usually performed through direct manipulation of the graphical elements. The GUIs may be provided in a software, a software application, a web browser, and the like. Links may be generated through an application programming interface (API) which is a set of routines, protocols, and tools for building software applications. A user may interact with the GUI through direct touch on a screen or IO devices such as handheld controller, mouse, joystick, keyboard, trackball, touchpad, button, verbal commands, gesture-recognition, attitude sensor, thermal sensor, touch-capacitive sensors, or any other device. A GUI may enable a user to interact with systems of the disclosure, such as for visualizing statistics about models. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input.

As utilized herein, terms "component," "system," "interface" and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers. Further, these components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal). As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In some cases, a component can emulate an electronic component via a virtual machine, e.g., within a cloud computing system.

A container is a form of operating system virtualization. For instance, a container can be a standard unit of software that packages up code and the dependencies so the application runs quickly and reliably from one computing environment to another. A single container can be used to run from a small microservice or software process to a larger application. A container may include all the necessary executables, binary code, libraries, and configuration files. A Docker container is a running instantiation of an image, essentially a working version of an image. In an example, a user may create or deploy a new container or application using a Docker. In some cases, to deploy a simple application using Docker, a user may create a directory and, inside the directory, create a Dockerfile. In the Dockerfile, the user may describe what they want to include in the container that they would like to run. The user may then run a "docker-build" command, which will examine the directory specified and the Dockerfile contained therein and build a Docker image. The user may then run a "docker run" command, which will create a Docker container that can run anything that has been specified in the Dockerfile. The aforementioned Docker images are essentially blueprints and can be considered as models that describe what a Docker container should look like, at least when the container is first started.

Multiple aspects of models may be monitored along with time. In some cases, performance of a model, accuracy of a model, data used in different phases (e.g., development, deployment, prediction, validation, etc) may be monitored along with time. The model monitor system may be capable of monitoring model drift. A model drift may include model performance drift and/or data drift. A model drift may be defined as a drift in model performance, data, or others with respect to a reference time (e.g., initial time), a normal condition/value, an initial model or initial dataset, or other user defined references. A model drift may refer to change in data or performance of a model over time.

Systems and methods herein may detect and track data drift in the model's input features and output predictions. Users may be permitted to select among a variety of statistical checks to suit different monitoring needs. For example, users may supply proprietary ground truth data for a model, and systems herein may ingest it to calculate and track the model's prediction quality using one or more standard measures such as accuracy, precision, and the like. The system may automatically check if the characteristics of the predictions versus the target data that were used to train the model are significantly different. The system may also track the difference between data that were used to train the models verses the data that are being presented to the models to score. Systems herein may permit users to set up scheduled checks, use APIs to ingest data, and configure alert notification recipients such users are capable of monitoring models at a large scale in a standardized manner with improved efficiency.

In some cases, systems and methods herein may permit users to set up rules for detecting the model drift. For example, one or more rules may be defined for detecting (input) data drift such as by checking descriptive statistics, data types (e.g., strings, integers, etc.), data ranges, and data sparsity/missing data, and then comparing them to the original training data. Drastic changes in input data distributions may indicate serious model degradation. The rules may also include metrics defined to track the difference between data used to train the model versus data that are being presented to the model to score. If the difference crosses a threshold or is drifting significantly, that is a strong indicator of model drift and degradation. The provided systems and methods may allow users to customize/add any rules (e.g., drift distribution analysis) that are suitable for monitoring the input data presented to a model in order to see if they have changed.

In some cases, systems and methods herein may provide system suggested rules, metrics, or other parameters. It is noted that some features (i.e., input features) are more important (predictive) than other features. The rules for detecting drift for important features may be different from rules for less important features. Important features that have drifted a small amount may suggest a model retraining, while features with low/no predictive power can drift a lot with negligible impact on the overall model. In some cases, systems herein may suggest the threshold for triggering the detection of a model drift for the important features and less important features. In some cases, the system may allow users to visualize the effect of the threshold set up for selected features.

A user may also set up one or more rules for detecting concept drift. The approaches for detecting concept drift may include, for example comparing the distribution of the labels of the training set versus those of the production data in real-time. Detecting the concept drift may include, for example, checking if a) the input values fall within an allowed set or range, and b) that the frequencies of each respective value within the set align with the historical data.

In some cases, a user may set an alert for alerting a model drift. A user may set up rules for alerting a model drift. For example, a user may create workflow rules by setting up threshold and alerts. The alert may be delivered in any suitable forms (e.g., audio, visual alert in a GUI, etc) or via any suitable communication channels (e.g., email, Slack, MSN).

In some cases, a production model for which a drift is detected may need to be re-validated and deployed again to re-train. With the model monitor system, models drifting can be detected instantly or in real-time. In some cases, upon detection of a model drift, a user may retrain and deploy new versions, or shut down and revert to a prior version to mitigate risk. The result of model drift may be accessed or visualized via a graphical user interface.

The model monitor system may be capable of capturing, archiving, or storing complex states of hierarchy of library and data dependencies. Typically, data science tasks comprise obtaining data from a raw state. Such data may be structured in a format (e.g., stored in a data structure) which is optimized for the system that created it. Next, the data is processed (e.g., by massaging, cleaning, aggregation, transformation, feature extraction, or a combination thereof) to allow for further analysis (e.g., analytical processes) to discern or determine one or more outputs, such as an underlying structure or a prediction of behaviors. Any or all of these different data processing or data analysis steps can be dependent on a hierarchy of libraries and data dependencies. For example, if a model is generated by an algorithm using a dozen different input data sets, a dozen data dependencies are created (one for each link between an input data set and an output model). The input data sets may themselves be dependent upon the outputs of one or more algorithms, creating a depth of hierarchy of libraries and data dependencies. Such hierarchy can be significant, often dozens of layers deep for complex models. In some cases, the model monitor system may be capable of accessing such data (e.g., reference, link) without possessing the data.

FIG. 1 shows an example of a system 100 for monitoring models. The system may also be referred to as a model monitor system or model monitoring system which is used interchangeably throughout the specification. The model monitor system 100 may comprise multiple components configured for monitoring models. The model monitor system may provide detailed history of models, generate model risk report, detect model drift (e.g., data drift, model performance drift), perform integrity check, generate risk or drift alert and various other functions. In some cases, the multiple components may be self-contained components that can be independently operated and worked on by different users concurrently. Each of the components may be a hardware module, software module, or a combination of hardware and software modules. The model monitor system 100 or one or more components of the model monitor system may be in communication with a cloud 113.

In some embodiments, the model monitor system 100 may comprise a user interface module 101 allowing users to monitor models via a GUI. The model monitor system 100 may provide a visual tool for visualizing various aspects of models in a convenient and dynamic manner. A graphical user interface (GUI) can be provided on a display of an electronic device 120. The display may be a screen. The display may or may not be a touchscreen. The display may be a light-emitting diode (LED) screen, OLED screen, liquid crystal display (LCD) screen, plasma screen, or any other type of screen. The display may be configured to show a user interface (UI) or a graphical user interface (GUI) rendered through an application (e.g., via an application programming interface (API) executed on the user device). The display can be a capacitive or resistive touch display, or a head-mountable display (e.g., Google® Goggles). Such displays can be used with other systems and methods of the disclosure.

In some situations, a GUI rendered by the user interface module 101 may have various graphical, textual, audio and/or video elements. A GUI is a type of interface that allows users to interact with electronic devices through graphical icons and visual indicators such as secondary notation, as opposed to text-based interfaces, typed command labels or text navigation. The actions in a GUI are usually performed through direct manipulation of the graphical elements. The GUIs may be provided in a software, a software application, a web browser, and the like. Links may be generated through an application programming interface (API) which is a set of routines, protocols, and tools for building software applications. A user may interact with the GUI through direct touch on a screen or IO devices such as handheld controller, mouse, joystick, keyboard, trackball, touchpad, button, verbal commands, gesture-recognition, attitude sensor, thermal sensor, touch-capacitive sensors, or any other device. A GUI may enable a user to interact with systems of the disclosure, such as for visualizing statistics about models. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input.

In some embodiments, the graphical user interface can have a search field or search toolbar that enables a user to input one or more search terms to be used by the system to conduct a search. The search field can include a drop-down menu, pull-down menu or other type of menu to enable a user to select, for example, commonly used words or previous search strings. A graphical user interface can have various other interactive elements such as buttons, bar, text boxes and the like, which may allow a user to provide input commands or contents by directly typing, clicking or dragging such interactive elements. For example, a user may input one or more parameters for defining rules for alerting an error or model drift, or provide any other type of input via text fields. More examples of the graphical user interface are described later herein.

The model monitor system may comprise application Program Interfaces (API) 103 configured to register a model with the model monitor system, associate that model with a particular training dataset, automatically map the underlying features, and then register ongoing inferences by the model against the training dataset to understand deviations from the training data set, register a prediction result, register parameters for alerting a model drift, register notification channels and various other functionalities. In some embodiments, the application Program Interfaces (API) 103 may allow a user to provide either actual training data or metrics that characterize the model. The APIs 103 can be any suitable API gateway that may allow developers to encapsulate the internal structure of an application in multiple ways, depending upon use case. This is because, in addition to accommodating direct requests, gateways can be used to invoke multiple back-end services and aggregate the results.

In some cases, the APIs 103 may comprise an API for registering a model. For instance, if a call to API is made without supplying a model ID, the API may call the model ID generator to generate a new ID and associate the supplied model with the ID in the database 115. The version number may be set to 0 when the version number is not available. If a call to the API is made with the model ID (e.g., model_id) specified, the API may check the database and see if the (model_id.version_id) pair is unique. If not, an error may be generated. In addition to generating and/or storing the model ID, the API may also store the timestamp when the model was registered. As an example, the data required to register a model using the API may include model path (e.g., project_id.experiment_id.model_id.version_number), model type (e.g., {classification, regression, clustering}), algorithm (e.g., {random_forest, support_vector_machine, gradient_boosted_machine, decision tree}), hyper parameters, training data (e.g., feature columns, prediction columns, prediction data, prediction columns, etc), metrics, or URL (i.e., path to the file that contains the data in the DataFrame). One or more of the abovementioned data may be user-defined or customizable. For instance, users may specify their own model type or algorithms via the user interface 101.

In some cases, when the actual data used to train a model is not available, a user may supply summary statistics and metrics for the training data set that was used to build the model. The user may be able to register the data used to train the model or the summary statistics of the training data using the API as described above.

The model monitor system may also comprise a process engine 105 for detecting and calculating a model drift. Such model drift detection may be performed regardless of statistical programming language (e.g., R, Python, etc.) and model types (e.g., classification, regression, clustering). After a drift is calculated, the process engine may push a computed drift value to a message bus or a queue. In an exemplary process, the process engine may receive a model ID as input, and process the model features in the model ID. The process engine may then send the calculated drift to a queue. In some cases, the process engine may listen to the event that a new prediction is registered and scan the prediction and model. Upon registration of predictions, the process engine may start to compute a drift such as a distribution change and push the results to the queue.

The model monitor system 100 may comprise a rules engine 107 for processing rules that relate to determining a drift or triggering an alert. The rules engine 107 may be responsible for processing any rules defined or set up by users. Details about the rules engine and rules are described later herein.

A notification engine 111 of the model monitor system may be configured to generate and send notifications/alerts. The alert may be delivered in any suitable forms (e.g., audio, visual alert in a GUI, webhooks that can be integrated into other applications, etc.) or via any suitable communication channels (e.g., email, Slack, SMS). In some cases, the notification engine may receive a message indicating a detected model drift, and in response to receiving the message, the notification engine may generate a notification and send the notification to a user. In some cases, rules may be set to run the abovementioned process periodically on a schedule, and notification may be generated when drift events are detected.

The notification engine 111 may also specify notification channels based on a set of channels that are configured for the model monitor system, including but not limited to, email alerts, Slack alerts, SMS, ServiceNow, PagerDuty and the like. Notifications of events can be delivered in various ways such as be published to a message bus (e.g., on a Kafka topic on a Kafka bus) that is shipped as part of the model monitor system. Apache Kafka is an example of a distributed event streaming platform for Publisher-Subscriber communication and eventing. Other suitable platform that is capable of handling real-time data feeds can be utilized. The platform may provide an asynchronous system wherein each module is responsible for handling its own state and logic and communicates with other modules via the platform. The notification engine 111 may be configured to collect valid configuration for the notification channel. For example, the notification engine may collect API_KEY, channel name and the like for Slack, SMTP auth, from_address, to_address and the like for Mail.

As an example, the input to a notification engine may include rule ID (i.e., the rule ID for which the corresponding notification occurs), model ID, notification URL to which the payload to be passed, a notification status (e.g., ENUMs_SENT, NOT_SENT), metadata or configuration data (e.g., to_address, from_address) and/or notification data. In some cases, once the rule ID is put to a message queue, the notification engine may listen to the rule ID, fetch the details of the rule and check the result. If the result indicates to trigger an alert, the notification engine may then fetch the notification details and start to process the notification. For example, the notification engine may generate a notification template data (e.g., "Divergence threshold for model1 is below 0.2"). Once the template data is generated, the notification engine may write a notification_created event to a message bus, and make a request for the desired configuration (e.g., sending an email, sending slack message) for sending the message. Once the message is sent, the response from the message may be stored as a response object in the database 115. If the response is not delivered, the notification engine may retry the request based on a retry configuration (e.g., for 5 times, with an interval of 5 seconds).

It is noted that although the notification engine is described for notifying a detected drift event, various other methods can be used for notifying a drift or events. For example, the model monitor system may notify users about an event (e.g., detected drift) by making a synchronous API call which returns yes/no and details of the checks, or allowing users logging into a web user interface to view a notification.

A scheduler 109 of the model monitor system may be configured to schedule sending notifications or alerts about an event (e.g., detected drift). In some embodiments, the scheduler 109 may receive an ID of a schedule as input, pass the required data to the scheduler and send a model ID to a queue for sending notifications. For example, the scheduler 109 may listen to "registered schedule", pass the configuration to scheduler, and start the job. Once the scheduled time is arrived then it may publish an event "send_notifications" to the queue.

Figure 2:
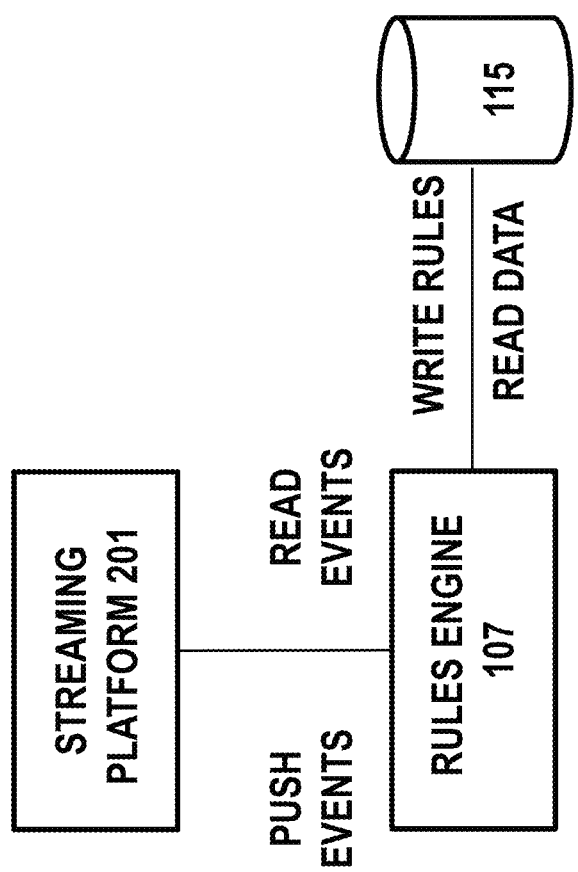
FIG. 2 shows an exemplary rules engine, in accordance with some embodiments of the invention.

FIG. 2 shows an exemplary rules engine 107, in accordance with embodiments of the invention. The rules engine 107 is configured to process rules. In some cases, the rules engine may process rules upon detection of pre-determined events (e.g., read events from streaming platform 201). For instance, the rules engine may listen to the event that a new prediction is registered (e.g., a new parameter, metric, rule set up by a user via a graphical user interface). Upon receipt of such event, the rules engine may process the associated rules. Additionally or alternatively, the rules engine may process rules according to a pre-determined schedule. In some instances, the rules engine may send processed rules to a streaming platform 201 (e.g., Monitor Queue on Kafka).

The rules engine 107 may allow users to define rules for determining a drift, and/or rules for triggering and delivering a notification. For example, a user may select metrics (e.g., Kullback Leibler divergence, Kolmogorov Smirnov test, Chi square test) that represent drift in either input or prediction data. The rules engine may also allow users to combine metrics. For example, uses may define compound metrics using operators such as AND/ORs to combine metrics for distribution drift of individual feature. A user may also set up a threshold for a rule (e.g., divergence threshold=0.3). In another example, a user may input parameters for triggering an alert and channels for delivering the alert upon detection of a drift. In some cases, the rules engine may be in communication with the database 115 to store new rules or modified rules (e.g., write rules) or retrieve data such as rules (e.g., read data).

In some cases, the rules engine 107 may receive model ID as an input (e.g., read events/data), process the rules associated with the model ID and send the processed rules (e.g., push events) to the streaming platform 201 (e.g., Monitor Queue on Kafka). The rules engine may listen to the event that a new prediction is registered and scan the prediction and model (e.g., read events from streaming platform 201).

Figure 3:
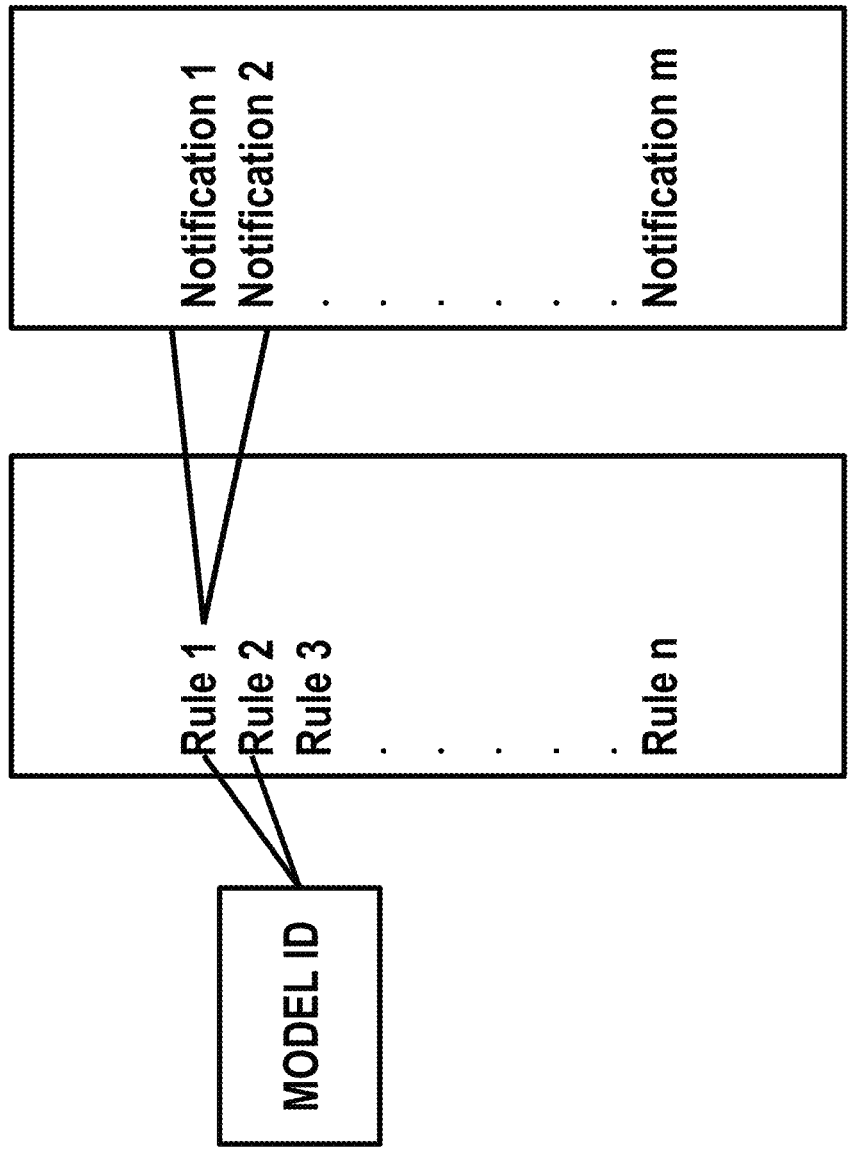
FIG. 3 shows an example of notification and rules.

A model can be associated with one or more rules. A user may create multiple rules for a model. In some cases, a rule may be associated with one or more notification channels. FIG. 3 shows an example of notification and rules. As described above, a model specified by a model ID may be associated with one or more rules (e.g., rule 1, rule 2) and each rules may be associated with one or more communication channels such as email, Slack, MSN (e.g., notification 1, notification 2) and various others.

Figure 4:
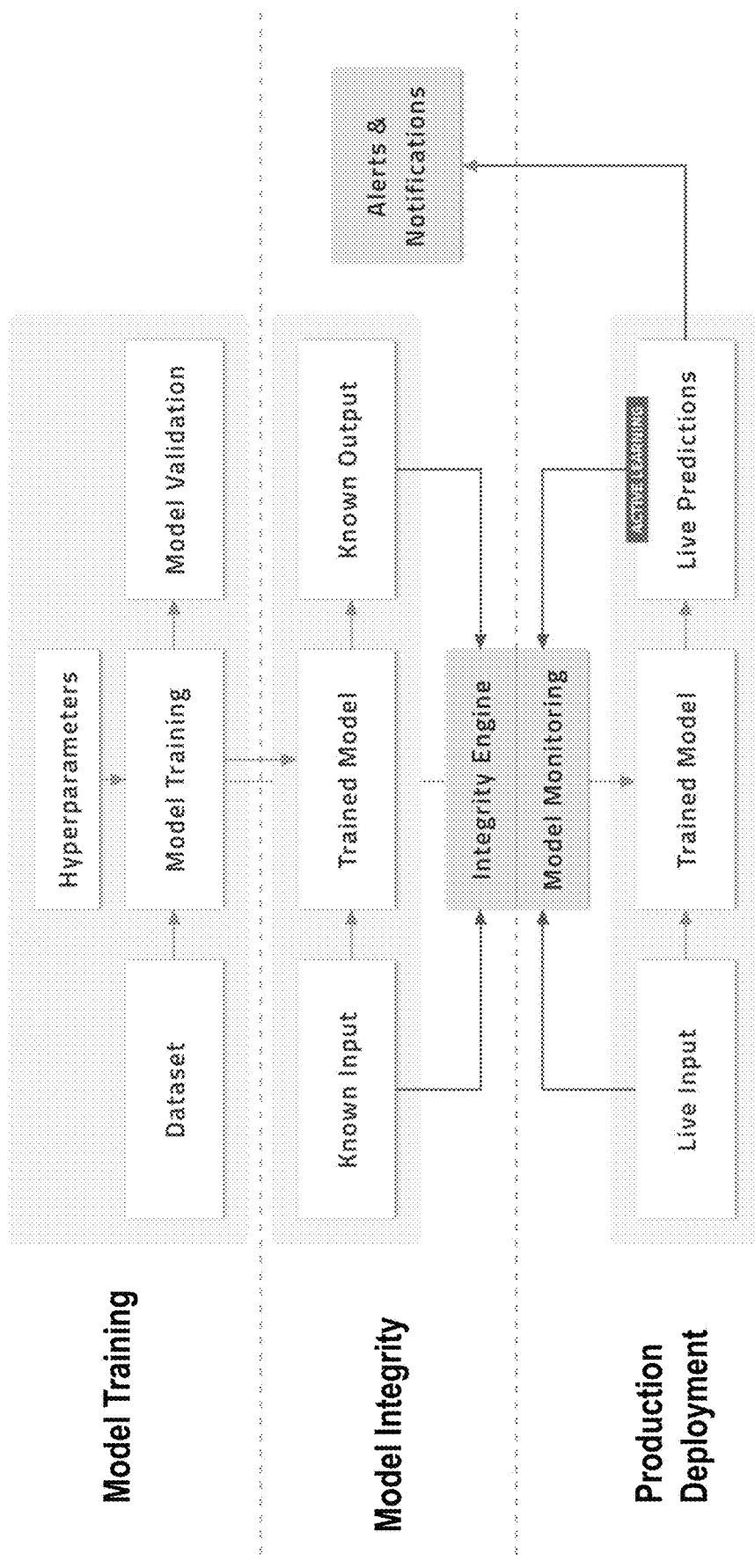
FIG. 4 shows various functions provided by a model monitor system.

FIG. 4 shows various functionalities provided by a model monitor system. A model monitor system may monitor data drift or performance of a model in different phases (e.g., development, deployment, prediction, validation, etc.). The model monitor system may also perform data integrity checks for models that have been deployed in a development, test, or production environment.

Data monitored by the model monitor system may include data involved in model training and during production. The data at model training may comprise, for example, training, test and validation data, predictions and scores made by the model for each data set, or statistics that characterize the above datasets (e.g., mean, variance and higher order moments of the data sets). Data involved in production time may comprise time, input data, predictions made, and confidence bounds of predictions made. In some embodiments, the ground truth data may also be monitored. The ground truth data may be monitored to evaluate the accuracy of a model and/or trigger retraining of the model. In some cases, users may provide ground truth data to the model monitor system or a model management platform after a model is in production. The model monitor system may monitor changes in data such as changes in ground truth data, or when new training data or prediction data becomes available.

Figure 5:
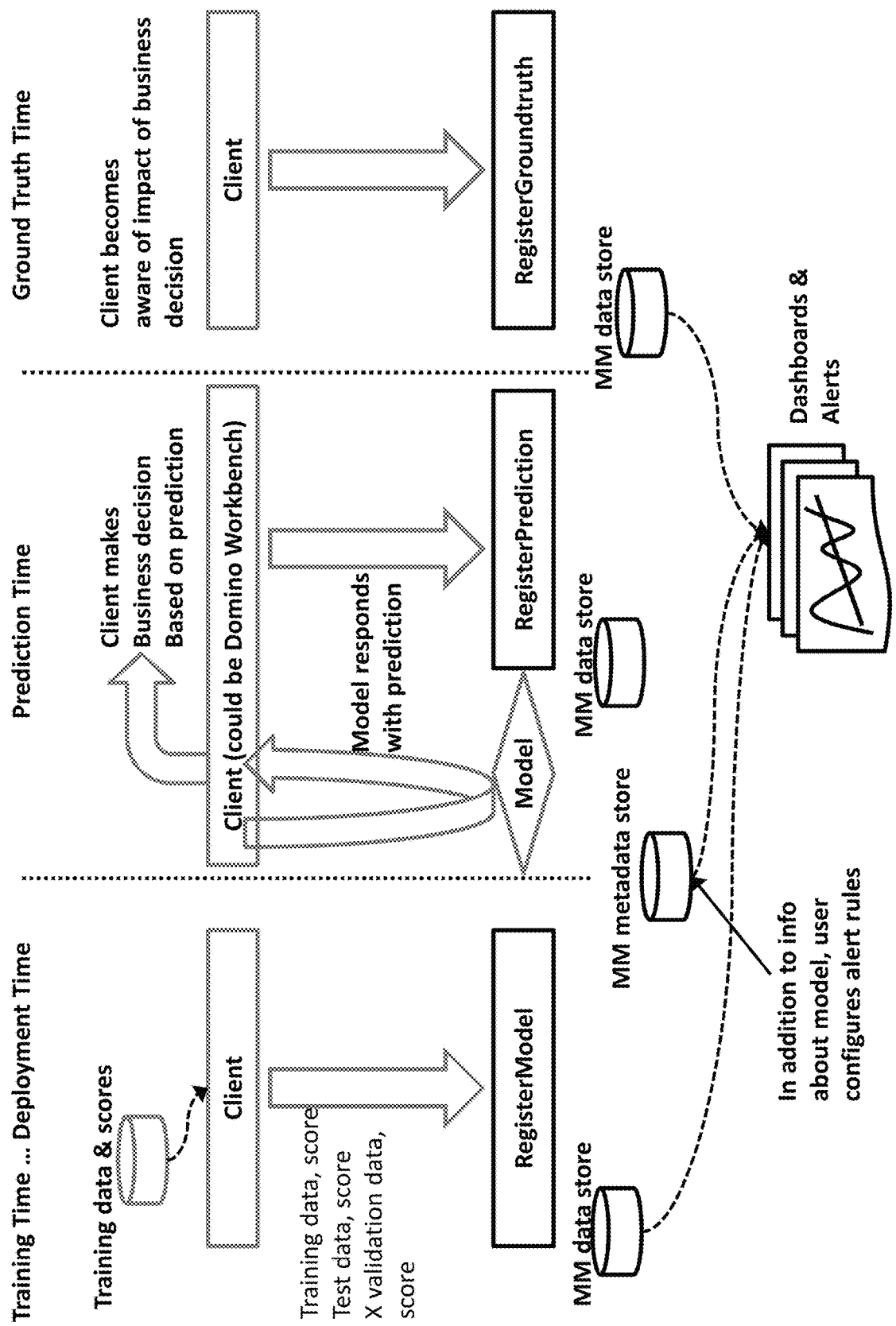
FIG. 5 shows an exemplary workflow associated with a model monitor system.

The model monitor system may be configured to perform data integrity checks and detect data drift and accuracy degradation. FIG. 5 shows an exemplary workflow when running the model monitor system. The process may begin with detecting data drift in training data and prediction data. During training and prediction, the model monitor system may monitor difference in distributions of training data, test, validation and prediction data, change in distributions of training data, test, validation and prediction data over time, covariates that are causing changes in the prediction output, and various others. Alerts on model accuracy may be generated and delivered when new ground data becomes available. The model monitor stem may also provide dashboards to track model performance/model risk for a portfolio of models based on the training/prediction data and model registration data collected as part of data drift, accuracy and data integrity checks.

As shown in the example, the functionalities provided by the model monitor system may comprise register model, register predictions, register checks and schedules for the checks, and register notification preferences.

The model monitor system may register information about the model and the data that was used to train/build the model. The model monitor system may define but may not restrict a model to be an artifact created or trained by applying an algorithm to the training data, and then deployed to make predictions against real data. A model may be associated with an experiment and may evolve over time as different data is provided to the model and/or parameters are tuned. The model monitor system may comprise a model ID generator component that generates a model ID (e.g., model_id) uniquely associated with a model. The model ID may be deployment-wide unique and monotonically increasing as described elsewhere herein.

In some embodiments, an API may be used for registering a model. For instance, if a call to API is made without supplying a model ID, the API may call the model ID generator to generate a new ID and associate the supplied model with the ID in a database. The version number may be set to 0 when the version number is not available. If a call to the API is made with model_id specified, the API may check to see in the database if the (model_id.version_id) pair is unique. If not, an error may be generated. In addition to generating and/or storing the model ID, the API may also stors the timestamp when the model was registered. As an example, the data required to register a model using the API may include model path (e.g., project_id.experiment_id-.model_id.version_number), model type (e.g., {classification, regression, clustering}), algorithm (e.g., {random_forest, support_vector_machine, gradient_boosted_machine, decision_tree}), hyper parameters, training data (e.g., feature columns, prediction columns, prediction data, prediction columns, etc), metrics, or URL (i.e., path to the file that contains the data in the DataFrame). One or more of the abovementioned data may be user defined or customized. For instance, users may specify their own model type or algorithm through a user interface.

In some cases, when the actual data used to train a model is not available, a user may supply summary statistics and metrics for the training data set that was used to build the model. The user may be able to register the data used to train the model or the summary statistics of the training data using the API as described above.

During prediction time, once a model is registered with the model monitor system, predictions may be associated with the model in order to track data drift or to incorporate feedback from new ground truth data. In some embodiments, an API (e.g., RegisterPrediction API) may be used for registering prediction. For example, the RegisterPrediction API may allow users to specify the time the prediction actually occurred by providing timestamp column. In some cases, the model monitor system may generate and store a monotonically increasing number as prediction ID for each prediction (e.g., prediction_id). When a prediction timestamp is not provided, the combination of prediction ID and the corresponding prediction may provide an estimated time when that prediction occurred. The RegisterPrediction API may also allow users to define and register new metrics that to be tracked.

The model monitor system may register checks. Checks may be registered to generate notification about data integrity problems, data drift checks or changes in ground truth accuracy. In some cases, checks may be registered to be associated with one or more of the input features that were used for modelling. Checks may be registered via the UI or by calling an API. In some cases, users may also schedule checks to run periodically by calling a scheduler API. In some cases, multiple checks can be combined by operators (e.g., AND/OR).

The model monitor system may register notifications. In some cases, once the models, predictions, ground truth and checks are set up, users may configure a template or rules that may be used to send the notification message depending on the checks fail/pass. A user may configure the template or rule via the UI or by calling an API. A user may also set or configure one or more notification channels using an API.

In some cases, upon receiving a notification, the model monitor system may take one or more actions. The one or more actions may include, for example, unpublish model/fallback to last known working version of the model, return error/fallback response values for models that are problematic, or retrain and re-deploy models for consumption by different applications.

The model monitor system may allow users to perform data checks. For example, users may perform data checks on the training and prediction data that has been registered with the system. Various data checks may be provided by the model monitor system, including but not limited to, values outside/within a range either in batch mode or across different sliding/growing time windows, data type checks either in batch mode or across different sliding/growing time windows, data distribution hasn't changed at all over time as an indicator that something is suspect, or changes in volume of prediction/training data being registered over time.

The model monitor system may be capable of monitoring and managing model portfolio traffic, health status and performing model risk management. For example, the model monitor system may allow users to view the performance of a portfolio of models that have been deployed. For instance, a model portfolio dashboard may be displayed to users on a client device and showing aggregates of health statistics, traffic, data integrity checks both at a portfolio level and at a model level. The user interface may be configured to provide various functions such as scheduled risk reports and risk dashboard.

Figure 8:
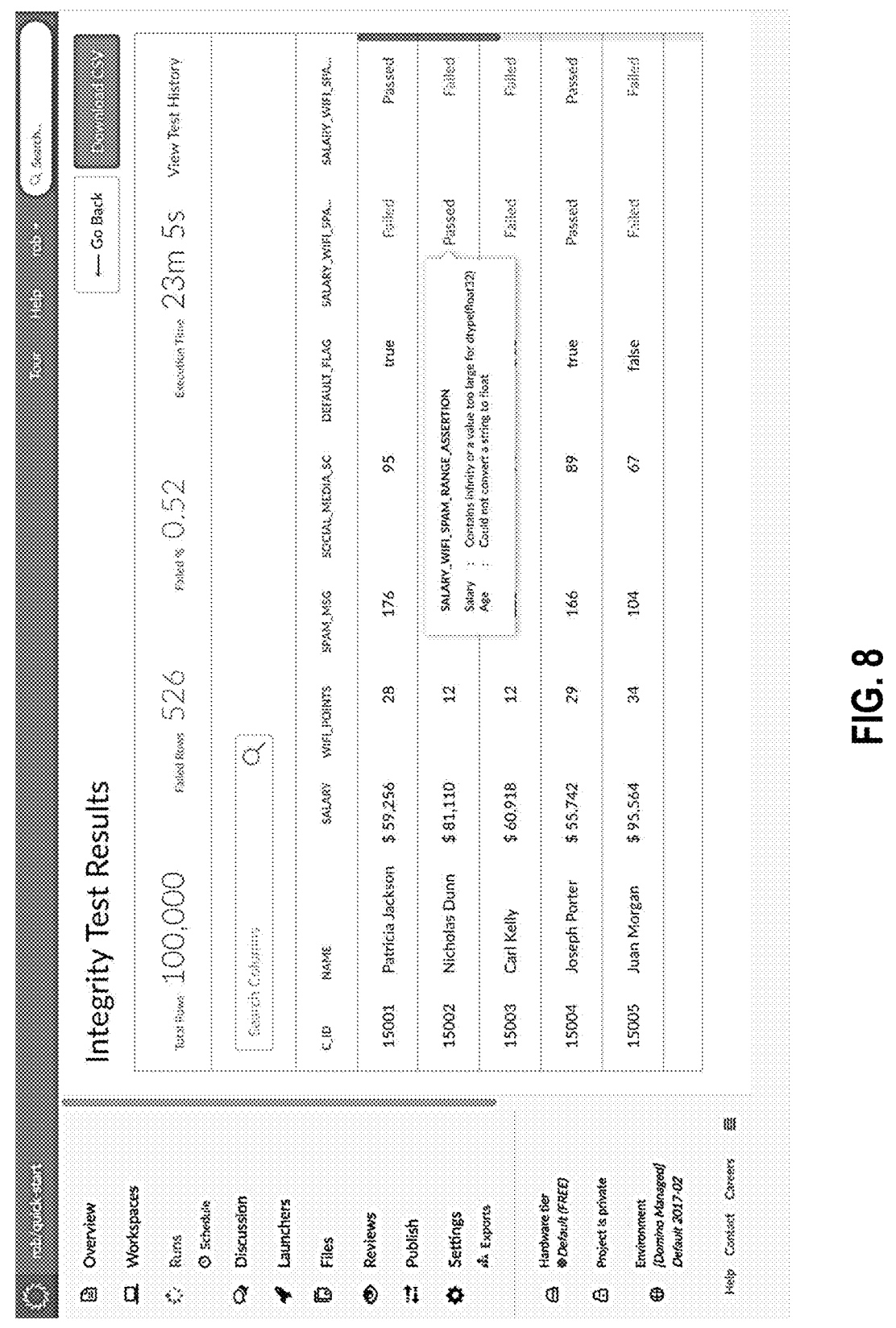

FIGS. 6-8 show examples of user interfaces for model monitoring. In some embodiments, a risk dashboard may display a model dependency graph. A model dependency graph may show how these various key components are mapped to each other across models. For example, in a model dependency graph, models may be represented as nodes and data are represented as the arcs. The combination of information may be useful for determining potential impact of various components. For example, if a component is reused many times, improvement or variation in the component can have far-reaching effects. A graphical display of the model dependency may assist a user in determining what the impact may be of changing a particular component. The risk dashboard may also display a model list view showing usage of a model, status of a drift, volume of traffic and trends, changes in user or reason of use, change in metrics and various other metrics related to a model. The risk dashboard may allow users to view the data in various different arrangements and forms. In some cases, a global model history view showing lifecycle or prediction events, amount of traffic, model performance or metrics may be provided.

In some embodiments, the model monitor system may access the historical data and provide a view of past performance and activity for a portfolio of models. A model history dashboard may be provided allowing users to view various metrics and information about the portfolio of models. In some cases, the model monitor system may allow users to monitor models via a GUI. As described above, the model monitor system may be configured to register a model with a model monitoring system, associate that model with a particular training dataset, automatically map the underlying features, and then register ongoing inferences by the model against the training dataset to understand deviations from the training data set. Such model drift detection may be performed regardless of statistical programming language (e.g., R, Python, etc.) and model types (e.g., classification, regression, clustering).

Figure 6A:
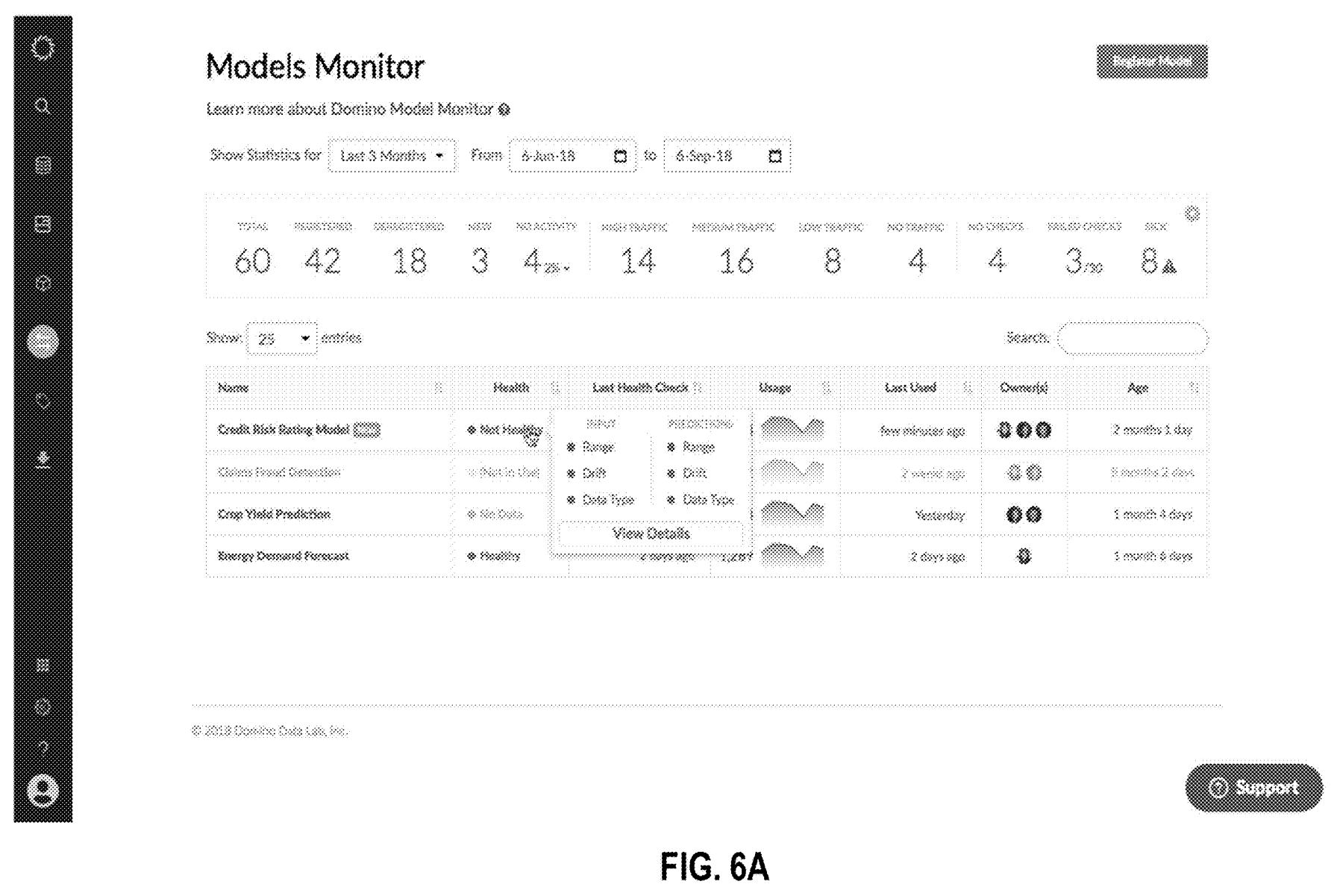

In some cases, a production model may drift over time and need to be re-validated and deployed again to re-train. With the model monitor system, models drifting can be detected instantly. In some cases, upon detection of a model drift, a user may retrain and deploy new versions, or shut down and revert to a prior version to mitigate risk. The result of model drift may be accessed or visualized via the graphical user interface. FIG. 6A shows an example of various features monitored for a set of models. Various aspects of a model may be monitored and displayed on the graphical user interface. For example, a model health status (e.g., not healthy, healthy, etc), result of last health check (e.g., drift in data or performance, range of drift, etc), usage, last used time, owners of the model/project, model life (e.g., age) and others can be displayed to users via suitable format (e.g., scatter plot, bar graph, etc). FIG. 6B shows another example of model monitoring user interface. The model monitoring user interface may display information related to model drift such as a drift trends chart for each model, calculated drift, and metrics/methods for calculating the drift (e.g., test type, threshold, etc.).

Figure 9:
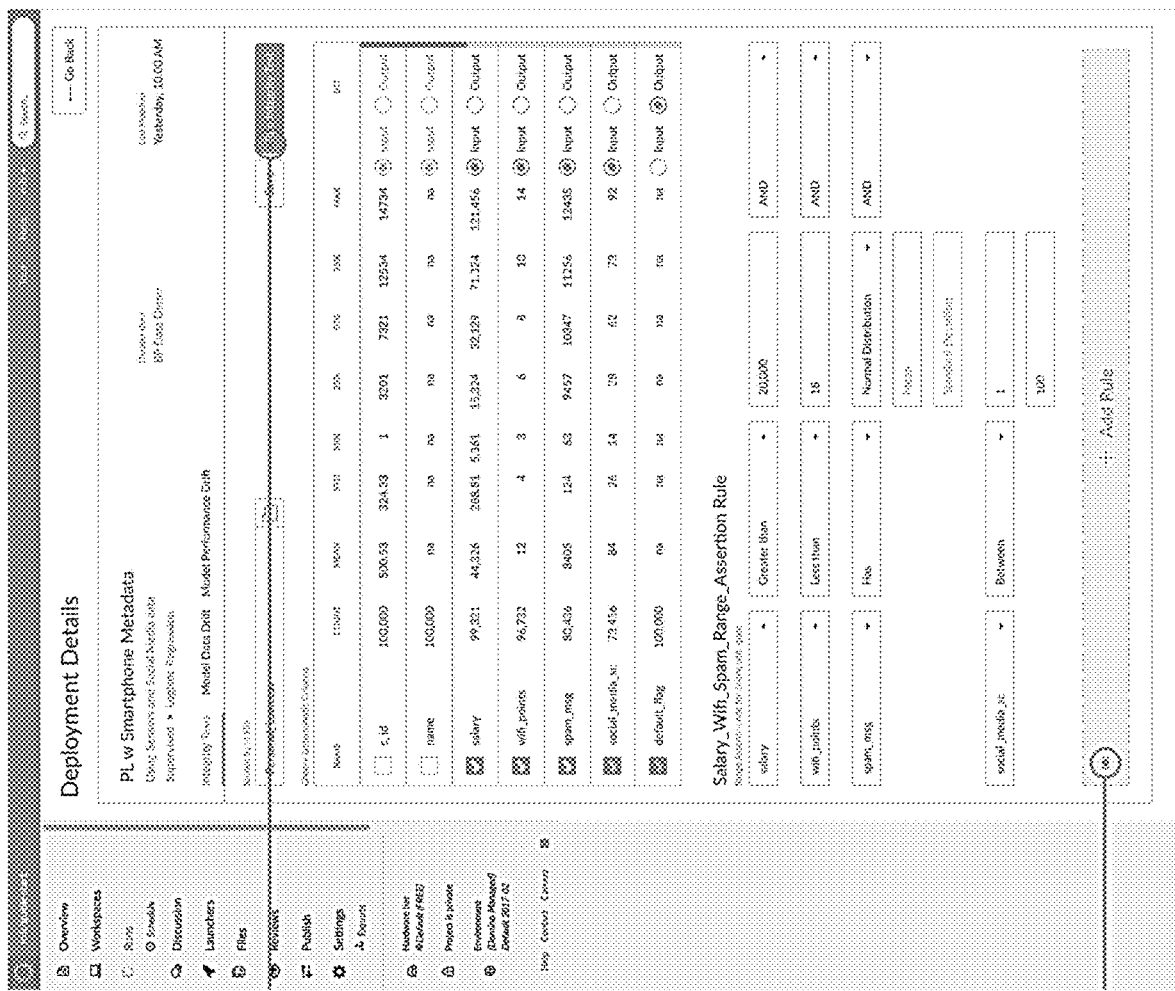
Figure 10:
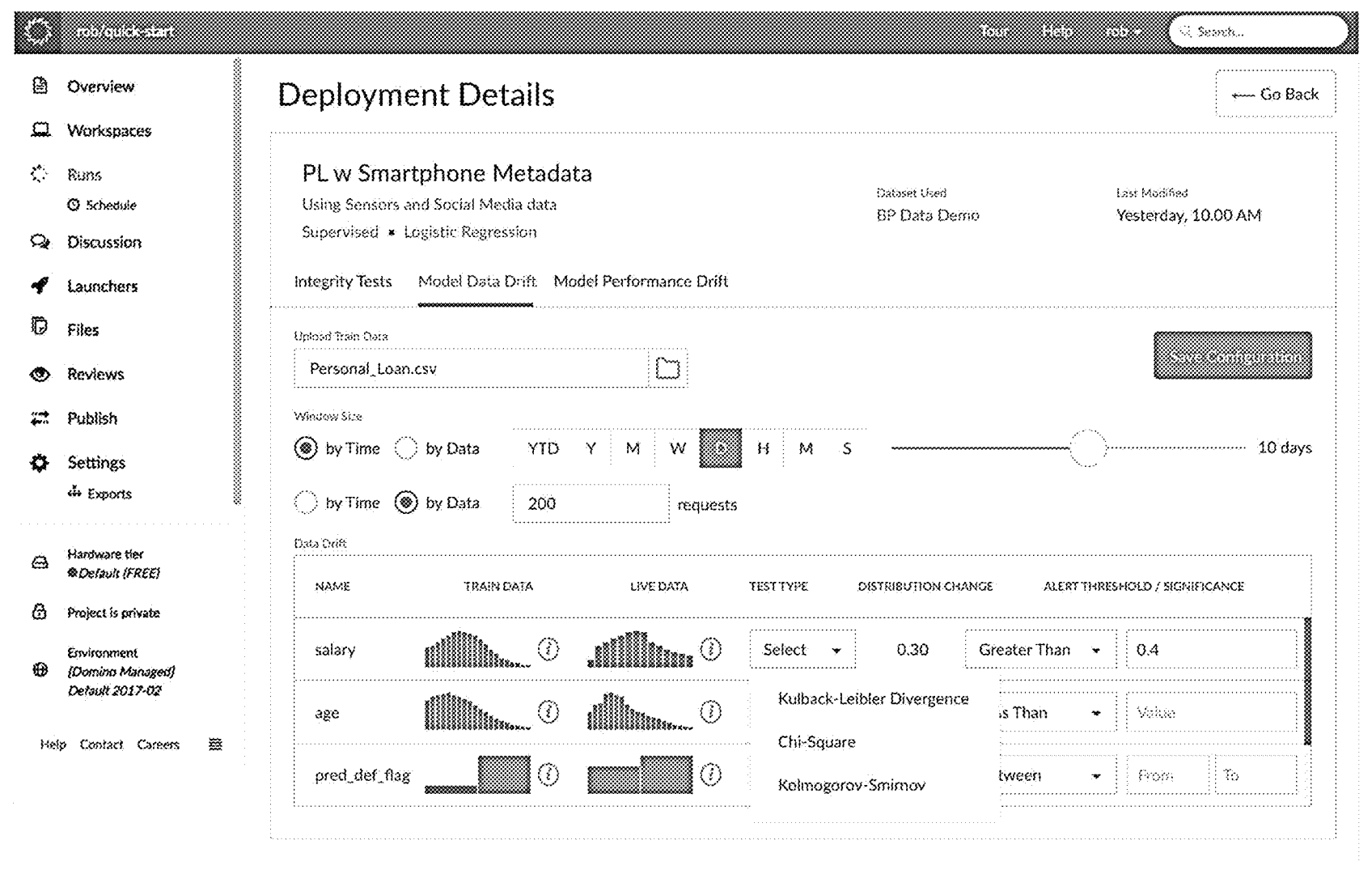
Figure 11:
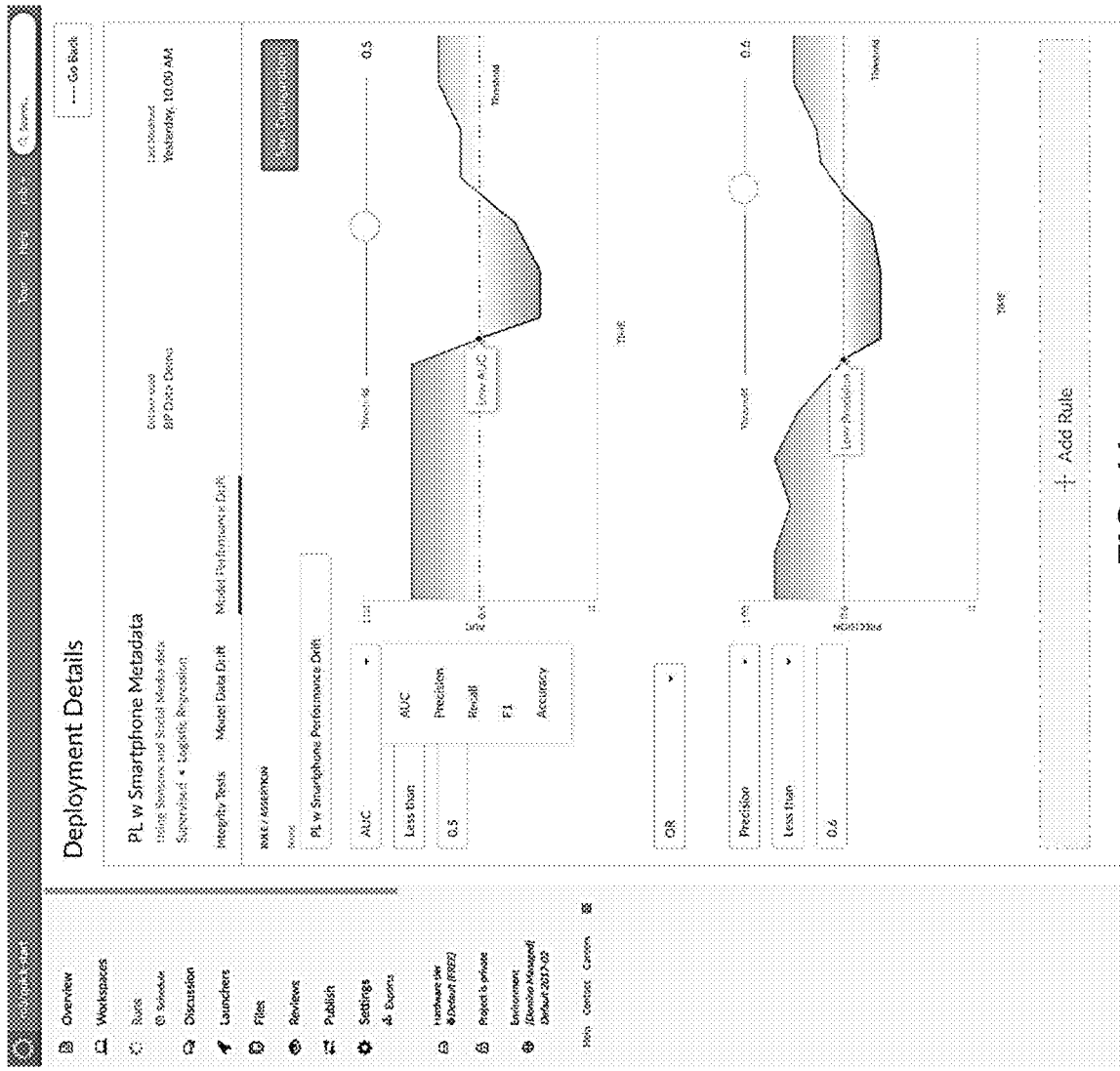

FIG. 7 shows another exemplary user interface for monitoring model drift in runs. In some cases, a log of the models may be displayed with the graphical user interface allowing users to view or sort the models with respect to selected parameters (e.g., title, company, source, time, response, etc). A user may select and/or set up rules (e.g., data drift, performance drift) for metrics (e.g., input features, distribution of data) to be monitored. As an example, clicking on the category "logistic regression" 701 may direct the user to further details such as the deployment details shown in FIG. 9. As shown in FIG. 9, a user may click on the "run integrity test" button to launch an integrity check. An example of the integrity check result is shown in FIG. 8. In some cases, the functions of setting the data drift rule 703 and/or the model drift rule 705 are provided via an intuitive graphical user interface as shown in FIG. 10 and FIG. 11.

FIG. 8 shows an example of a user interface for integrity check results. In some embodiments, one or more integrity tests on a model may be performed and the results may be displayed on the graphical user interface. For example, the integrity test result may show the number of failed rows, percentage of row entries failed the test, execution time of the test, and details of each entry. Such results can be displayed to users via any suitable format (e.g., table, log view, scatter plot, bar graph, etc.).

In some embodiments, statistics (e.g., usage) of an application may be displayed. In some cases, statistics of users who use the application may be tracked and analyzed. The statistics can be displayed in any suitable formats such as bar plots, diagrams, pie charts, tables, histograms and the like. A user may customize the histogram via the graphical user interface such as by changing the period of time or other filtering terms or appearance parameters (e.g., size of the plot, color, or type of plot). In an example, statistics about the app viewed over a period of time may be displayed in a histogram. Additionally, a log view of people who viewed the app (e.g., user stats) may also be displayed. The log view may allow a user to sort the user statistics by variables such as name or number of views. In some cases, the model monitor system may also be configured to track hardware usage and expenditure across both cloud and on-premise platforms for machine learning model development and delivery. In some cases, uses and costs of hardware resources for model development and deployment in the cloud, on-premise, or in a hybrid deployment are tracked. By tracking the hardware usage and cost, users may be able to drill down to understand usage by a project, a user, and/or a hardware type over time. Display of hardware usage and expenditure information may be broken down as shown in the example and may aid in analyzing the usage statistics.

A user may set up rules for detecting or determining a drift in data and a drift in model performance via a GUI provided by the model monitor system. A user may also set up rules for integrity check and rules for alerting a detected drift via a GUI provided by the model monitor system. For example, a user may create rules by setting up threshold and alerts.

FIGS. 9-12 show examples of user interfaces for rules set-up. A user may set up rules by adding/deleting rules, changing parameters of rules (e.g., threshold, deliver channel, etc) or any other actions. For example, a user may define a channel for delivering an alert such that the alert may be delivered in a user-defined form (e.g., audio, visual alert in a GUI, etc) or user-selected communication channels (e.g., email, Slack, MSN). A user may set up, edit or change rules by interacting with various components provided within the GUI. A user may provide inputs via interactive elements on the graphical user interface for editing one or more rules for reviewing a report, generating a report or displaying a report. For example, a user may choose which charts to show/hide or define parameters of a chart (e.g., "number of records", "start time"). In another example, a user may adjust the filtering terms (e.g., number of records) by manipulating a sliding bar. A user may select a test type or threshold through a drop-down menu, pull-down menu or other type of menu that provides pre-determined range, options or user-defined values. A graphical user interface can have various other interactive elements such as buttons, text boxes and the like, which may allow a user to provide input commands or contents by directly typing, clicking or dragging such interactive elements.

Figure 12:
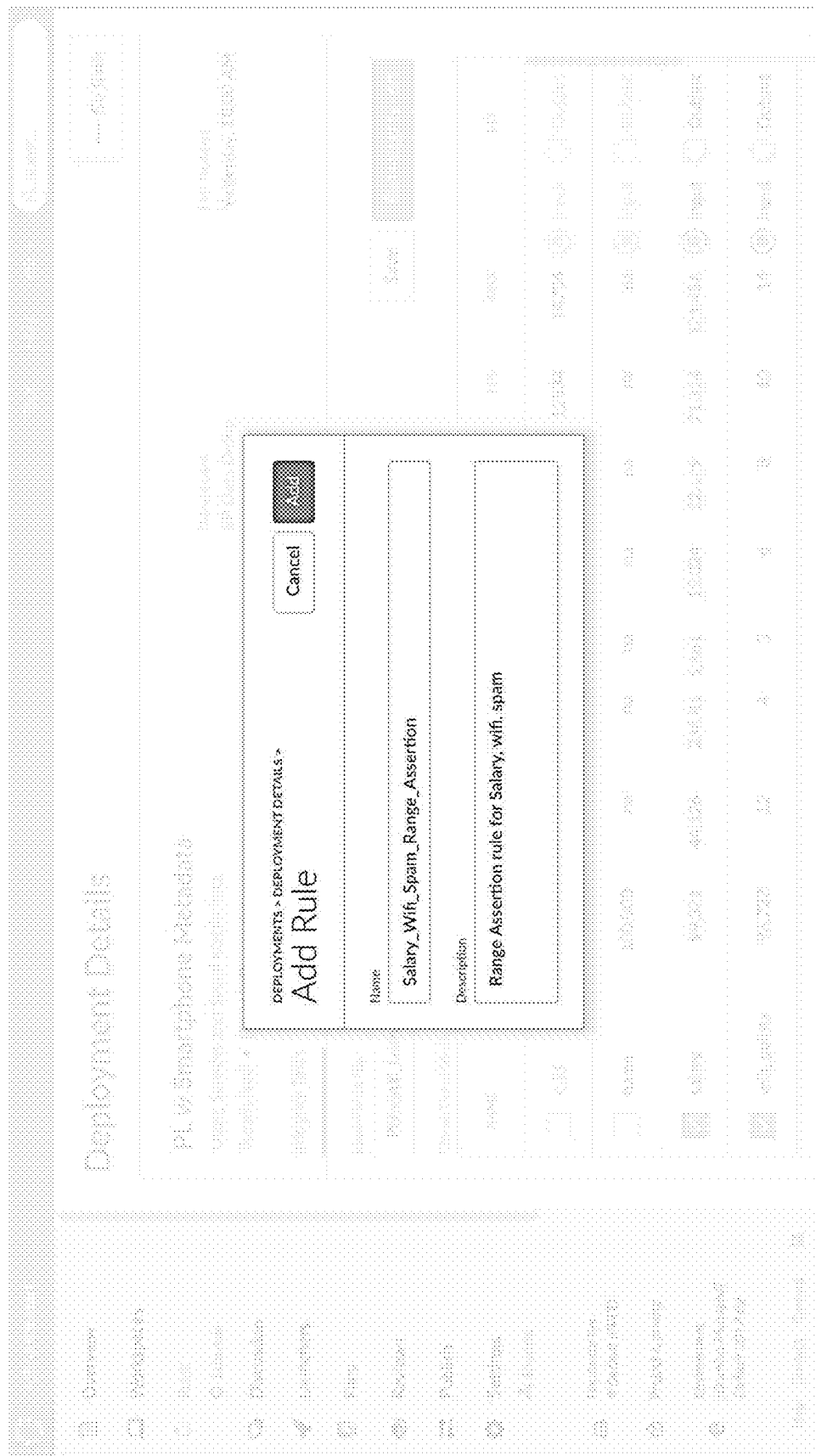

As shown in FIG. 9, a user may set up a rule by first select from the deterministic columns (e.g., salary, wifi_points, spam_msg, socia_media_sc) and specify the threshold (e.g., greater than, 20,000, less than, 18, has normal distribution), and combine of the multiple parameters (e.g., using operators such as AND/ORs to combine metrics). FIG. 10 shows an example of a graphical user interface for a user to set up rules for detecting model data drift. In the illustrated example, a user may configure the rules by setting up the monitoring window and frequency (e.g., by time, by data), selecting test type (e.g., Kulback-Leibler divergence, Kolmogorov-Smirnov test, Chi-square test), distribution change, threshold for triggering an alert, etc. The user interface may also allow users to upload training data so the user can view the comparison between the live data and training data in real-time. FIG. 11 shows an example of a graphical user interface (GUI) for a user to set up rules for detecting model performance drift. As shown in the example, a user may set up the threshold for triggering an alert. The GUI may allow users to see the effect of a user-defined threshold dragging the threshold bar and the performance trend chart may be updated in real-time with the threshold (e.g., line indicating the threshold). This may beneficially allow users to visualize the effect of a threshold for detecting a model drift. The GUI may also allow users to add a new rule (e.g., clicking on the "+Add Rule" button). As shown in FIG. 12, upon clicking on the "add rule" button, a pop up window may be displayed to prompt the user to enter the name and description about the new rule.

In some cases, a user may be permitted to edit a model monitor dashboard. For example, a user may modify a display arrangement or change the appearance of the results view and statistics. A user may provide inputs via interactive elements on the graphical user interface for editing one or more rules for reviewing a report, generating a report or displaying a report. For example, a user may choose which charts to show/hide or define parameters of a chart (e.g., "number of records", "start time"). In another example, a user may adjust the filtering terms (e.g., number of records) by manipulating a sliding bar.

Figure 13:
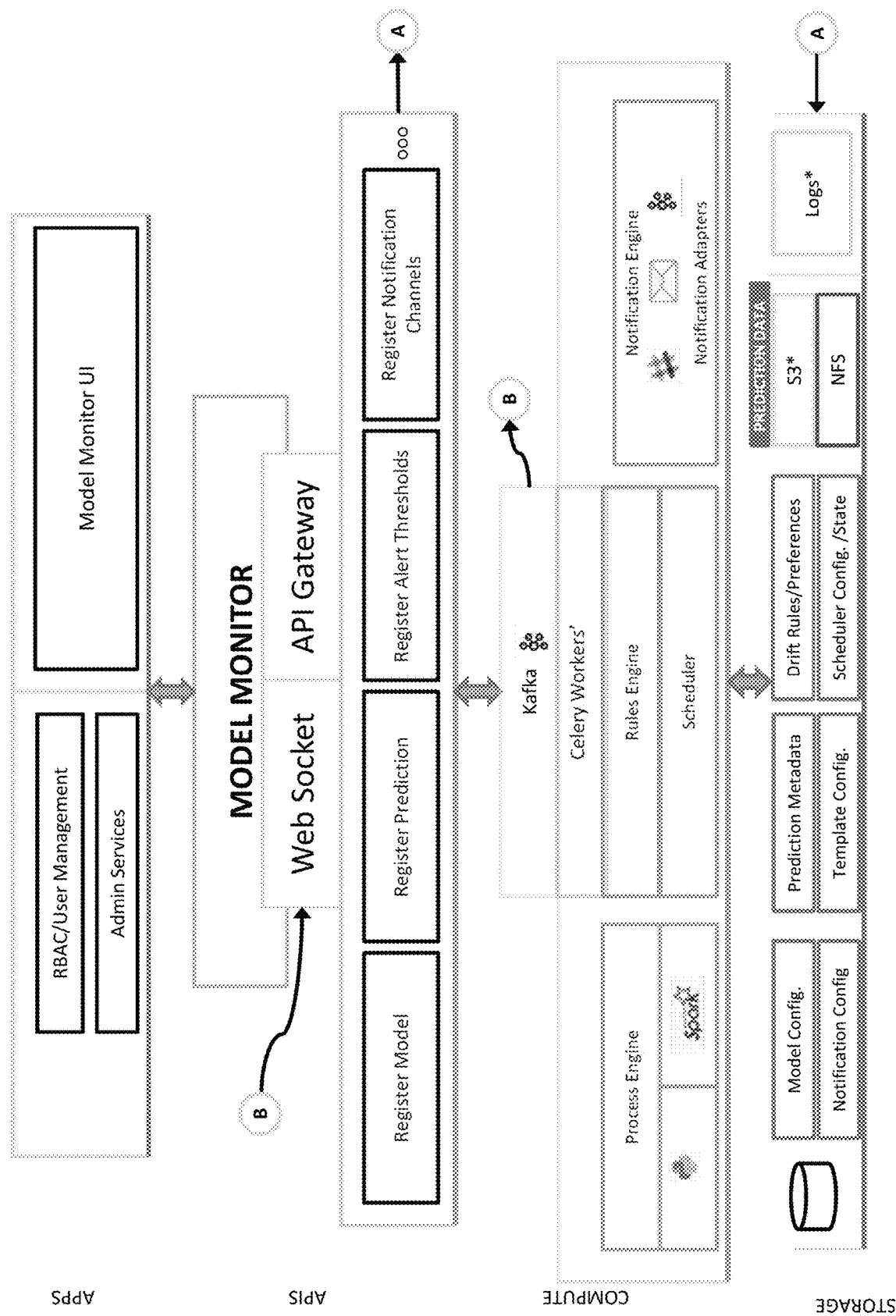
FIG. 13 shows components of an exemplary model monitor system.

FIG. 13 shows components of an exemplary model monitor system. The components can be the same as the components as described in FIG. 1. For example, the model monitor system may comprise an Apache Kafka for Publisher-Subscriber communication. Apache Kafka is an example of a distributed event streaming platform for Publisher-Subscriber communication and eventing. Other suitable platform that is capable of handling real-time data feeds can be utilized. The platform may provide an asynchronous system wherein each module is responsible for handling its own state and logic and communicates with other modules via the platform. As illustrated in the example, Slack, email and Kafka integrations may be included for notifying users upon detection of a drift in the data or if any data integrity checks have been violated. The rule engine may define and register checks for the data and models that have been registered as described elsewhere herein. The process engine may be used to execute the checks that have been registered for the data and models. The socket.io may be used for pushing events about model registration, data registration and status of checks to UI. The database may be used for storing data and metadata for the training data, prediction data, models, checks, schedules, results of checks and others. In some cases, raw training/prediction data may be stored on a network file system and/or support cloud file systems.

Figure 14:
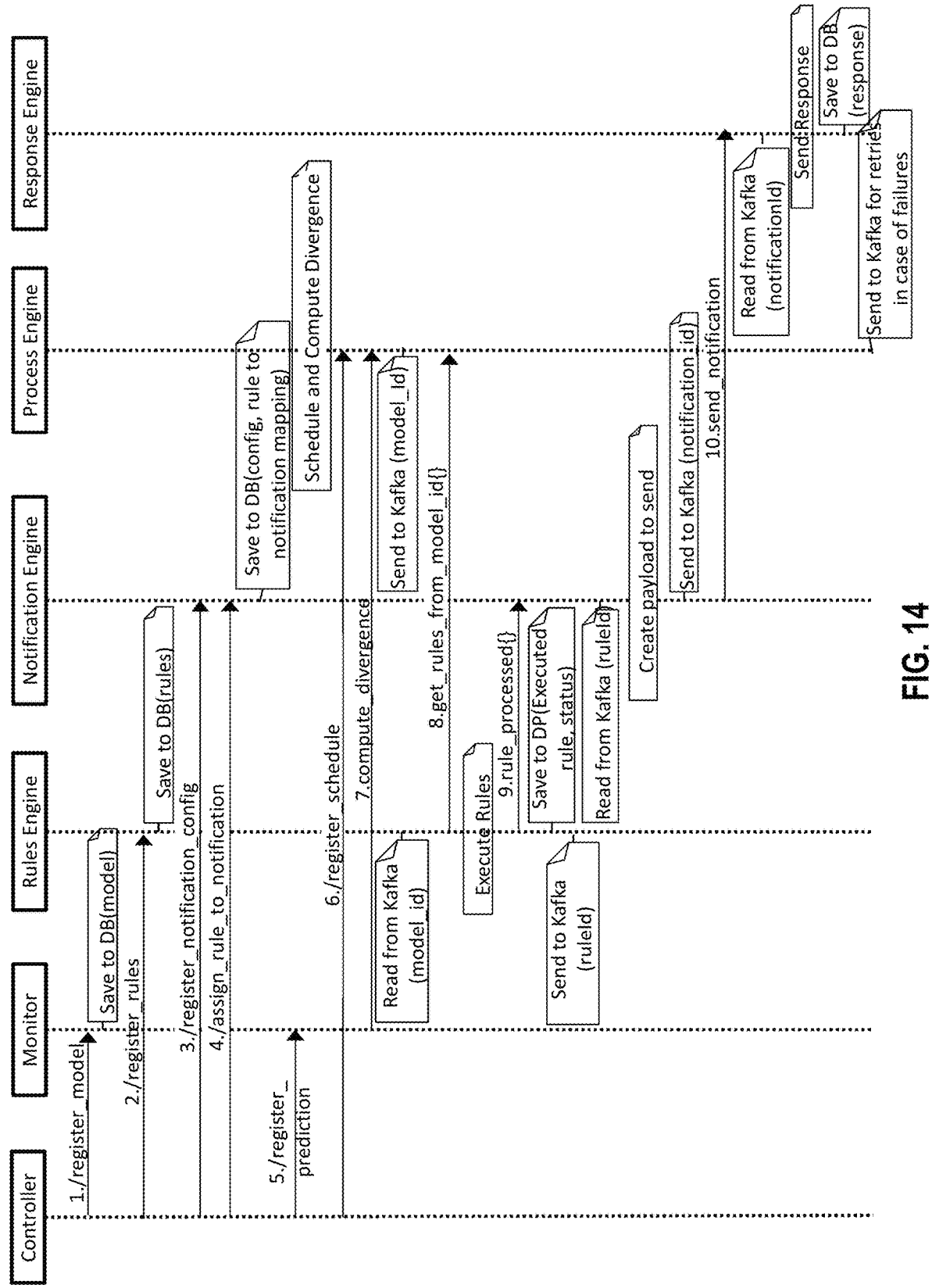
FIG. 14 shows an example of model monitoring sequence and communications among various components in a model monitoring system.

FIG. 14 shows an example of model monitoring sequence and communications among the various components in the model monitoring system. For instance, when a rule is registered, the front-end may call the rules engine to register the rule and save the rule in a rule database (operation 2). The model monitoring module may listen to new prediction events (operation 1) and save the events to the model database. Upon receiving a new prediction, the monitoring module may register the prediction (operation 5) and rules engine may process rules associated with the model.

Various components as shown in FIG. 14 can be the same as the components as described in FIG. 1. For example, the process engine may be configured to register schedule (operation 6) and detect and calculate a model drift (operation 7). Such model drift detection may be performed regardless of statistical programming language (e.g., R, Python, etc.) and model types (e.g., classification, regression, clustering). In some cases, the process engine may be configured to post a computed drift value to a message bus or the streaming platform (e.g., send to Kafka). In an exemplary process, the process engine may receive a model ID as input, and process the model features in the model ID. The process engine may then send the calculated drift to a queue. In some cases, the process engine may listen to the event that a new prediction is registered and scan the prediction and model. Upon registration of predictions and/or a scheduled event (operation 6), the process engine may start to compute a drift such as a distribution change and push the results to the queue. The process engine may get rules from the rules engine (operation 8) for determining a drift. The notification engine may receive a processed rule result such as message indicating detected model drift (operation 9) such as reading from the message bus (e.g., read from Kafka (ruled)), and create a payload to be sent. The notification engine may then send the notification to the response engine (operation 10) via the message bus. The response engine may read from the message bus to receive the notification, send a response and save the response to a response database. In the case of failure, the process engine may retry sending the computed drift to the message bus.

The present disclosure provides computer systems that are programmed to implement methods and systems of the disclosure. FIG. 15 shows a computer system 1501 that is programmed or otherwise configured to implement a model monitor system as described above. The computer system 1501 can regulate various aspects of the present disclosure, such as, for example, implementing various components of the model monitor system, rendering graphical user interfaces and the other functions as described elsewhere herein. The computer system 1501 can be an electronic device of a user or a computer system that is remotely located with respect to the electronic device. The electronic device can be a mobile electronic device.

The computer system 1501 includes a central processing unit (CPU, also "processor" and "computer processor"

herein) 1505, which can be a single core or multi core processor, or a plurality of processors for parallel processing. The computer system 1501 also includes memory or memory location 1510 (e.g., random-access memory, read-only memory, flash memory), electronic storage unit 1515 (e.g., hard disk), communication interface 1520 (e.g., network adapter) for communicating with one or more other systems, and peripheral devices 1525, such as cache, other memory, data storage and/or electronic display adapters. The memory 1510, storage unit 1515, interface 1520 and peripheral devices 1525 are in communication with the CPU 1505 through a communication bus (solid lines), such as a motherboard. The storage unit 1515 can be a data storage unit (or data repository) for storing data. The computer system 1501 can be operatively coupled to a computer network ("network") 1530 with the aid of the communication interface 1520. The network 1530 can be the Internet, an internet and/or extranet, or an intranet and/or extranet that is in communication with the Internet.

The network 1530 in some cases is a telecommunication and/or data network. The network 1530 can include one or more computer servers, which can enable distributed computing, such as cloud computing. For example, one or more computer servers may enable cloud computing over the network 1530 ("the cloud") to perform various aspects of analysis, calculation, and generation of the present disclosure, such as, for example, capturing a configuration of one or more experimental environments; performing usage analyses of products (e.g., applications); and providing outputs of statistics of projects. Such cloud computing may be provided by cloud computing platforms such as, for example, Amazon Web Services (AWS), Microsoft Azure, Google Cloud Platform, and IBM cloud. The network 1530, in some cases with the aid of the computer system 1501, can implement a peer-to-peer network, which may enable devices coupled to the computer system 1501 to behave as a client or a server.

The CPU 1505 can execute a sequence of machine-readable instructions, which can be embodied in a program or software. The instructions may be stored in a memory location, such as the memory 1510. The instructions can be directed to the CPU 1505, which can subsequently program or otherwise configure the CPU 1505 to implement methods of the present disclosure. Examples of operations performed by the CPU 1505 can include fetch, decode, execute, and writeback.

The CPU 1505 can be part of a circuit, such as an integrated circuit. One or more other components of the system 1501 can be included in the circuit. In some cases, the circuit is an application specific integrated circuit (ASIC).

The storage unit 1515 can store files, such as drivers, libraries and saved programs. The storage unit 1515 can store user data, e.g., user preferences and user programs. The computer system 1501 in some cases can include one or more additional data storage units that are external to the computer system 1501, such as located on a remote server that is in communication with the computer system 1501 through an intranet or the Internet.

The computer system 1501 can communicate with one or more remote computer systems through the network 1530. For instance, the computer system 1501 can communicate with a remote computer system of a user (e.g., a user of an experimental environment). Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 1501 via the network 1530.

Methods as described herein can be implemented by way of machine (e.g., computer processor) executable code stored on an electronic storage location of the computer system 1501, such as, for example, on the memory 1510 or electronic storage unit 1515. The machine executable or machine readable code can be provided in the form of software. During use, the code can be executed by the processor 1505. In some cases, the code can be retrieved from the storage unit 1515 and stored on the memory 1510 for ready access by the processor 1505. In some situations, the electronic storage unit 1515 can be precluded, and machine-executable instructions are stored on memory 1510.

The code can be pre-compiled and configured for use with a machine having a processor adapted to execute the code, or can be compiled during runtime. The code can be supplied in a programming language that can be selected to enable the code to execute in a pre-compiled or as-compiled fashion.

Aspects of the systems and methods provided herein, such as the computer system 1501, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a model monitor server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 1501 can include or be in communication with an electronic display 1535 that comprises a user interface (UI) 1540 for providing, for example, the various components (e.g., lab, launch pad, control center, knowledge center, etc) of the model monitor system. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 1505. The algorithm can, for example, capture a configuration of one or more experimental environments; generate user defined reports of hardware usage; monitor models; and generate usage statistics of selected projects or models.

It should be noted that application of the provided methods and systems are not limited by the underlying computing infrastructure or computing environment. For instance, the provided model monitor system may be applied to grid computing platform or systems utilizing various technologies such as mesh computing, peer-to-peer computing, autonomic (self-healing) computing, wireless sensor networks, mobile data acquisition, mobile signature analysis, cooperative distributed peer-to-peer ad hoc networking and processing, local cloud/fog computing and grid/mesh computing, dew computing, mobile edge computing, cloudlet, distributed data storage and retrieval, remote cloud services, augmented reality and the like. It is understood in advance that although this specification includes description of cloud computing, implementation of the teachings recited herein are not limited to a cloud computing environment. Rather, embodiments of the present invention are capable of being implemented in conjunction with any other types of computing environment now known or later developed.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A system for monitoring machine learning models, comprising:
   one or more computer processors that are programmed to provide an application comprising:
   (i) a first software module for detecting a drift for a plurality of machine learning models utilizing a visual tool, wherein the visual tool comprises a first graphical user interface (GUI) prompting a user to enter a user input for setting one or more rules for defining and detecting the drift, wherein the user input entered via the first GUI comprises at least one of a test method for an input feature, a threshold for triggering a detection event, and a combination of multiple metrics for multiple input features for a machine learning model selected from the plurality of machine learning models;
   (iii) one or more engines configured to:
      a) upon receiving the user input for setting the one or more rules for defining and detecting the drift via the first GUI, store the one or more rules in a database, wherein the one or more rules are associated with a machine learning model identified by a unique identifier,
      b) upon receiving a new prediction generated by the machine learning model, retrieve the one or more rules from the database based at least in part on the unique identifier; and
   (iii) a second software module configured to provide a visualization of a result of the detection of the drift within a second GUI by processing at least the one or more rules retrieved in ii).

2. The system of claim 1, wherein the drift of the plurality of machine learning models comprises a drift in a dataset or a drift in model performance.

3. The system of claim 1, wherein the first GUI is configured to further display the threshold over a diagram of the drift.

4. The system of claim 1, wherein the first GUI is configured to display multiple options for delivering a notification upon a detected drift event.

5. The system of claim 1, wherein the second GUI is configured to display a drift trend, a calculated drift, a distribution of the training data and live data, or a test type, for at least one of the plurality of machine learning models.

6. The system of claim 1, wherein the system further comprises an Application Program Interfaces (API) for registering the new prediction.

7. The system of claim 6, wherein the one or more engines are further configured to execute the one or more rules retrieved from the database for computing the drift.

8. The system of claim 1, wherein the database further stores one or more notification channels associated with the machine learning model.

9. The system of claim 8, wherein the database further stores a computing environment and one or more training datasets associated with the machine learning model.

10. A method for monitoring machine learning models, comprising:
    (a) providing a visual tool for detecting a drift for a plurality of machine learning models, wherein the visual tool comprises a first graphical user interface (GUI) prompting a user to enter a user input for setting one or more rules for defining and detecting the drift, wherein the user input entered via the first GUI comprises at least one of a test method for an input feature, a threshold for triggering a detection event, and a combination of multiple metrics for multiple input features for a machine learning model selected from the plurality of machine learning models;

(b) upon receiving the user input for setting the one or more rules for defining and detecting the drift via the first GUI, storing the one or more rules in a database, wherein the one or more rules are associated with a machine learning model identified by a unique identifier;

(c) upon receiving a new prediction generated by the machine learning model, retrieving the one or more rules from the database based at least in part on the unique identifier; and (d) providing a second GUI for visualizing a result of the detection of the drift by processing the one or more rules retrieved in (c).

11. The method of claim 10, wherein the drift of the plurality of machine learning models comprises a drift in a dataset or a drift in model performance.

12. The method of claim 1, further comprising displaying the threshold over a diagram of the drift.

13. The method of claim 10, further comprising displaying, within the first GUI, multiple options for delivering a notification upon a detected drift event.

14. The method of claim 10, further comprising, within the second GUI, displaying a drift trend, a calculated drift, a distribution of the training data and live data, or a test type, for at least one of the plurality of machine learning models.

15. The method of claim 10, further comprising registering the new prediction by an Application Program Interfaces (API).

16. The method of claim 15, further comprising executing the one or more rules for computing the drift.

17. The method of claim 10, further comprising storing one or more notification channels associated with the machine learning model in the database.

18. The method of claim 17, further comprising storing a computing environment and one or more training datasets associated with the machine learning model in the database.

* * * * *